United States Patent
Agarwala et al.

(10) Patent No.: US 9,378,067 B1
(45) Date of Patent: Jun. 28, 2016

(54) AUTOMATED LOAD BALANCING ACROSS THE DISTRIBUTED SYSTEM OF HYBRID STORAGE AND COMPUTE NODES

(71) Applicant: Springpath, Inc., Sunnyvale, CA (US)

(72) Inventors: Sandip Agarwala, Cupertino, CA (US); Abhishek Chaturvedi, Mountain View, CA (US); Shravan Gaonkar, Gainesville, FL (US); Mallikarjunan Mahalingam, Cupertino, CA (US); Bhavesh Mehta, Sunnyvale, CA (US); Jyothir Ramanan, Sunnyvale, CA (US); Smit Shah, Sunnyvale, CA (US); Faraz Shaikh, Sunnyvale, CA (US); Praveen Vegulla, Cupertino, CA (US); Krishna Yadappanavar, Sunnyvale, CA (US)

(73) Assignee: Springpath, Inc., Sunnyvale, CA (US)

( * ) Notice: Subject to any disclaimer, the term of this patent is extended or adjusted under 35 U.S.C. 154(b) by 51 days.

(21) Appl. No.: 14/273,474

(22) Filed: May 8, 2014

(51) Int. Cl.
*G06F 9/46* (2006.01)
*G06F 9/50* (2006.01)
*G06F 15/173* (2006.01)

(52) U.S. Cl.
CPC ........ *G06F 9/5083* (2013.01); *G06F 15/17331* (2013.01)

(58) Field of Classification Search
CPC .................. G06F 9/5083; G06F 15/17331
USPC .......................................... 718/105
See application file for complete search history.

(56) References Cited

U.S. PATENT DOCUMENTS

| | | | |
|---|---|---|---|
| 6,985,937 B1 * | 1/2006 | Keshav | G06F 9/5077 370/231 |
| 7,236,966 B1 * | 6/2007 | Jackson | G06F 17/30867 |
| 8,775,861 B1 * | 7/2014 | Raizen | G06F 11/1662 714/4.12 |
| 9,092,290 B1 * | 7/2015 | Bono | G06F 8/61 |
| 2001/0052073 A1 | 12/2001 | Kern et al. | |
| 2003/0014599 A1 | 1/2003 | McBrearty et al. | |
| 2003/0189930 A1 | 10/2003 | Terrell et al. | |
| 2005/0108593 A1 * | 5/2005 | Purushothaman | G06F 11/2028 714/4.11 |
| 2005/0268054 A1 | 12/2005 | Werner et al. | |
| 2011/0258480 A1 | 10/2011 | Young et al. | |

(Continued)

OTHER PUBLICATIONS

VMWare Virtual SAN Hardware Guidance-VMWare, Jun. 2009 https://www.vmware.com/files/pdf/products/vsan/VMware-TMD-Virtual-SAN-Hardware-Guidance.pdf.

(Continued)

*Primary Examiner* — Qing Chen
(74) *Attorney, Agent, or Firm* — Blakely, Sokoloff, Taylor & Zafman LLP

(57) ABSTRACT

A distributed storage system that performs automated load balancing is described. In an exemplary embodiment, a storage controller server determines if there is duplicative data in a distributed storage system. In this embodiment, the storage controller server detects a load balancing event in the distributed storage system, where the distributed storage system includes a plurality of virtual nodes distributed across a plurality of physical nodes. In response to detecting the load balancing event, the storage controller server determines that a current virtual node is to move from a source physical node to a destination physical node. In addition, the current virtual node is one of the plurality of virtual nodes and the source and destination physical nodes are in the plurality of physical nodes. The storage controller server further moves the current virtual node from the source physical node to the destination physical node.

20 Claims, 22 Drawing Sheets

(56) References Cited

U.S. PATENT DOCUMENTS

| | | | |
|---|---|---|---|
| 2012/0117246 A1* | 5/2012 | Pujolle | H04L 41/0836 709/226 |
| 2012/0203825 A1* | 8/2012 | Choudhary | H04L 65/4076 709/203 |
| 2012/0278512 A1 | 11/2012 | Alatorre et al. | |
| 2014/0122795 A1 | 5/2014 | Chambliss | |
| 2014/0164621 A1* | 6/2014 | Nakama | H04L 47/70 709/226 |
| 2015/0039717 A1 | 2/2015 | Chiu et al. | |

OTHER PUBLICATIONS

"The Case for Persistent Full Clones," Deepstorage.net, http://getgreenbytes.com/wp-content/uploads/2013/05/FULL_CLONE_PERSISTENT_VDI-FINAL.pdf, 18 pages.

Rodeh, Ohad, "B-trees, Shadowing, and Clones," *ACM Transactions on Storage (TOS)* 3, No. 4, https://www.usenix.org/legacy/events/lsf07/tech/rodeh.pdf, (2008), 51 pages.

Rodeh, Ohad, "B-trees, Shadowing, and Clones," *ACM Transactions on Computational Logic*, vol. V, No. N, (Aug. 2007), 26 pages.

* cited by examiner

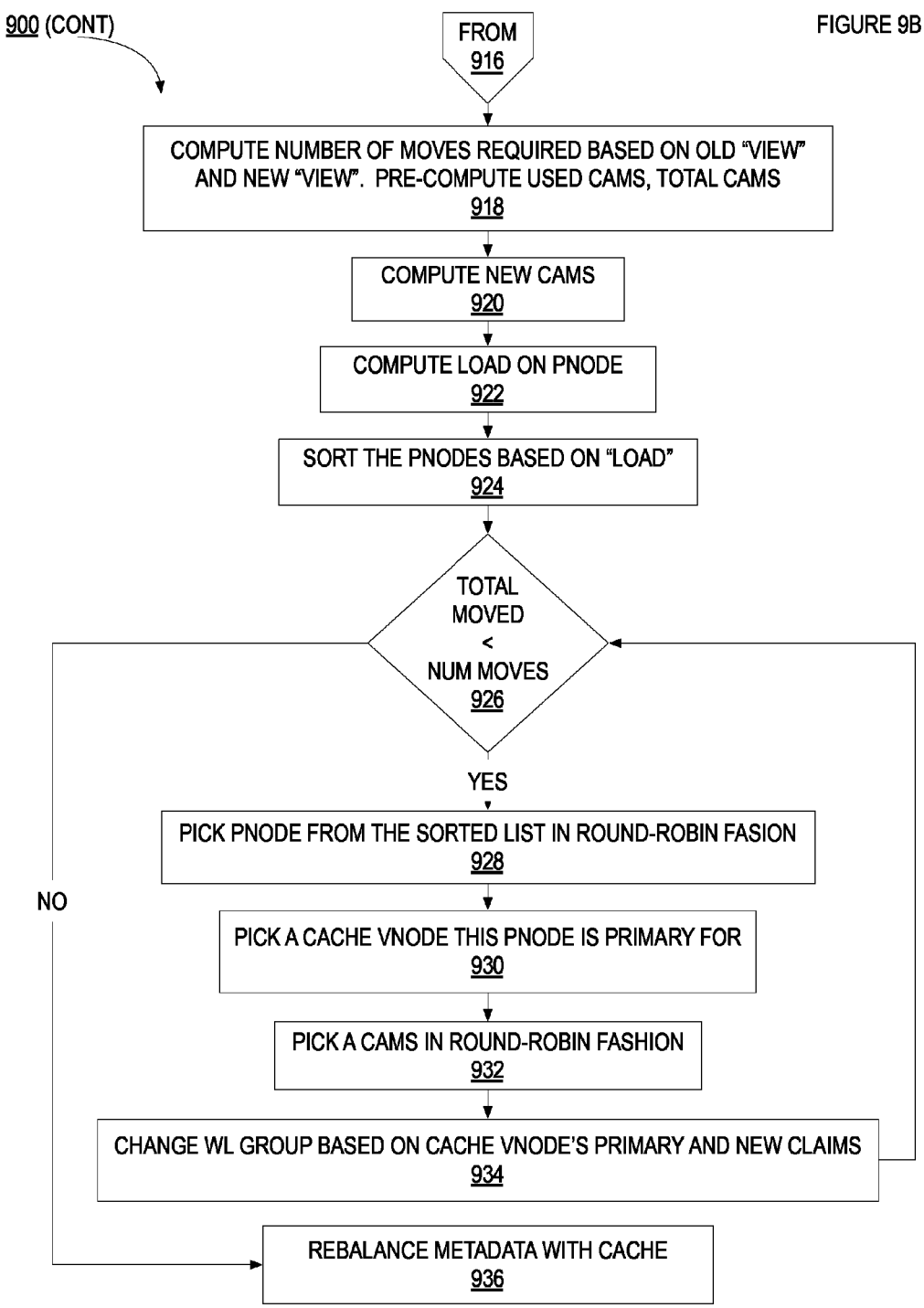

AUTOMATED LOAD BALANCING ACROSS THE DISTRIBUTED SYSTEM OF HYBRID STORAGE AND COMPUTE NODES

FIELD OF INVENTION

This invention relates generally to a storage system and more particularly to automated load balancing in a distributed storage system.

BACKGROUND OF THE INVENTION

Enterprise storage systems currently available are proprietary storage appliances that integrate the storage controller functions and the storage media into the same physical unit. This centralized model makes it harder to independently scale the storage systems' capacity, performance and cost. Users can get tied to one expensive appliance without the flexibility of adapting it to different application requirements that may change over time. For small and medium scale enterprise, this may require huge upfront capital cost. For larger enterprise datacenters, new storage appliances are added as the storage capacity and performance requirements increase. These operate in silos and impose significant management overheads.

Due to non-deterministic and non-uniform nature of workloads running on a the enterprise storage system, each storage node of a multi-node system has a potential of being imbalanced in storage capacity or input/output (I/O) servicing capacity in comparison to other nodes in the cluster. This could result in some storage nodes becoming full before others and thereby leading to uneven usage of storage. Alternatively, some compute nodes could bear the I/O load more than other nodes.

SUMMARY OF THE DESCRIPTION

A distributed storage system that performs automated load balancing is described. In an exemplary embodiment, a storage controller server detects a load balancing event in the distributed storage system that services user input outputs (IOs), where the distributed storage system includes a plurality of virtual nodes distributed across a plurality of physical nodes. In response to detecting the load balancing event, the storage controller server determines that a current virtual node is to move from a source physical node to a destination physical node without a disruption to the user IOs. In addition, the current virtual node is one of the plurality of virtual nodes and the source and destination physical nodes are in the plurality of physical nodes. The storage controller server further moves the current virtual node from the source physical node to the destination physical node without disrupting the user IOs.

Other methods and apparatuses are also described.

BRIEF DESCRIPTION OF THE DRAWINGS

The present invention is illustrated by way of example and not limitation in the Figures of the accompanying drawings in which like references indicate similar elements.

FIGS. 9A-B are flow diagrams of one embodiment of processes to rebalance cache vNodes.

DETAILED DESCRIPTION

Figure 1:
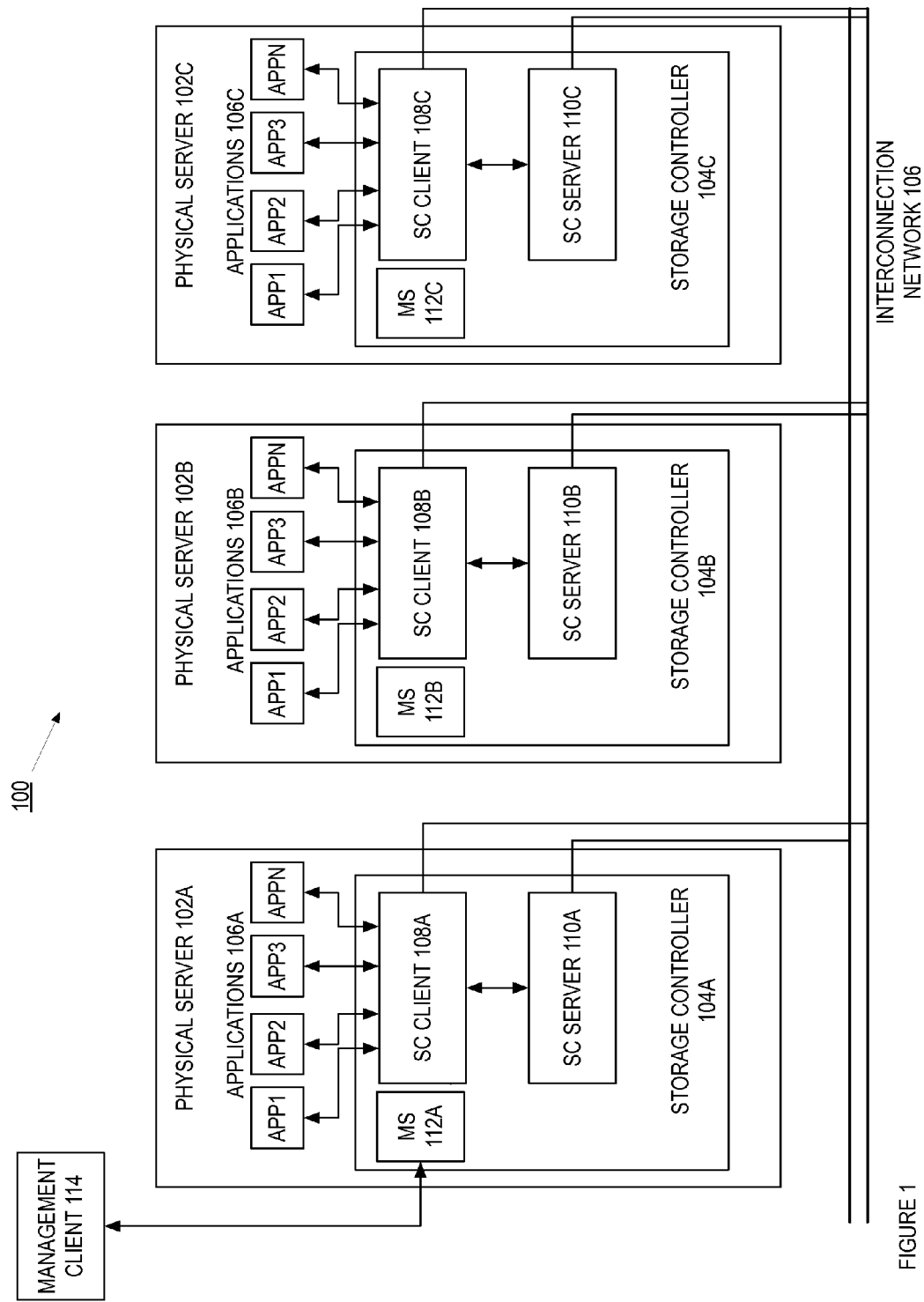
FIG. 1 is an illustration of one embodiment of a high-level view of StorFS system.

A distributed storage system called StorFS that performs automated load balancing is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A distributed storage system called StorFS that performs automated load balancing is described. As described above, due to non-deterministic and non-uniform nature of workloads running on a distributed file system each storage node has a potential of being imbalanced in storage capacity or input/output (I/O) servicing capacity in comparison to other nodes in the cluster. This could result in some storage nodes becoming full before others and thereby leading to uneven usage of storage or some compute nodes being accessed for I/O more than others. In one embodiment, the automated load balancing avoids storage and compute nodes from becoming imbalanced.

In this embodiment, the physical storage associated with each node in the cluster is partitioned into logical storage vNodes. On a high level, dynamic load balancing is achieved by dealing directly with virtual nodes (vNodes) that are distributed over the multiple physical nodes (pNodes) of the StorFS system. In one embodiment, a pNode is a storage server that includes one or more storage medium (e.g., a pNode is a storage node 102A-C described below). In one embodiment, the StorFS system aims at keeping the in use vNodes balanced so as to minimize the overuse of one or more pNodes and to increase the parallelization of the use of the pNodes. The Cluster Resource Manager Master (CRM-Master) is responsible for monitoring cluster resources (e.g., pNodes and their disks), and dynamically invoking load balancer at appropriate times to allocate or rebalance vNodes. The StorFS system further does dynamic resource allocation as opposed to large static allocation over all the resources available. By employing dynamic resource allocation, load balancing optimizes allocation of vNodes based on available resources at a given time rather than doing statically. In one embodiment, the load balancing methods described herein do not require the distributed storage system to be taken offline or user I/Os to be quiesced. As described below, once a vNode requiring rebalance is identified, a new mirror for that vNode is created in a new location (e.g., a different disk and/or pNode) and one of the old minors is retired. During this process, at least one of the mirror is online and therefore the cluster and the user I/O can continue to make progress.

FIG. 1 is an illustration of one embodiment of a high-level view of StorFS system 100. In FIG. 1, the StorFS system 100 includes storage nodes 102A-C coupled by an interconnection network 116. While in one embodiment, three storage nodes 102A-C are illustrated as part of the StorFS system 100, in alternate embodiments, there can be more or less storage nodes. For example and in one embodiment, the StorFS system 100 can include up to several hundred storage nodes. In one embodiment, each storage node 102A-C includes a storage controller (SC) client (also called dispatcher) 108A-C, a storage controller (SC) server 110A-C, or both. The SC servers 110A-C manage their underlying storage (e.g., Hard disk drive (HDD), Solid state drives (SSD), PCIe flash, etc.) and collectively provide reliable and unified storage functionality to the SC clients. The SC client 108A-C processes input/output (I/O) requests from the applications that are local to its physical storage node and routes them to the appropriate SC servers for processing. For example and in one embodiment, SC client 108A can send an I/O request locally to SC Server 110A and/or remotely to SC Servers 110B or 110C. The system is capable of exposing many different interfaces to the application like file (e.g. NFS, CIFS), object, key-value, or another type of interface. In one embodiment, the storage node 102A-C can be server, blade server, personal computer, or any other type of device capable of storing data. In one embodiment, the management server 112A-C is an agent that is used to communicate system management data and commands regarding the corresponding storage node 102A-C with the management client 114.

In one embodiment, the design of the StorFS system 100 distributes both the data and the metadata, and this system 100 does not require storing a complete global map for locating individual data blocks in our system. The responsibility of managing metadata is offloaded to each individual storage nodes 102A-C. In one embodiment, a cluster manager (CRM) resides on each SC Server 110 maintains some global metadata, which is small compared to the local metadata. In one embodiment, each logical file (or entity) is partitioned into equal sized "stripe units." The location of a stripe unit is determined based on a mathematical placement function Equation (1):

$$\text{Virtual\_Node\#}=\text{Hash}(\text{Entity}_{Id},\text{Stripe\_Unit\#})\%\ \text{Total\_Vitual\_Nodes}$$

$$\text{Stripe\_Unit\#}\frac{\text{offset}}{\text{Stripe\_Unit\_Size}}\%\ \text{Stripe\_Unit\_Per\_Stripe} \quad (1)$$

The $\text{Entity}_{Id}$ is an identification of a storage entity that is to be operated upon, the Total_Virtual_Nodes is the total number of virtual nodes in the StorFS system 100, the offset is an offset into the storage entity, and the Stripe_Unit_Size is the size of each stripe unit in the StorFS system 100. The value Stripe_Unit_Per_Stripe is described further below. In one embodiment, the storage entity is data that is stored in the StorFS system 100. For example and in one embodiment, the storage entity could be a file, an object, key-value pair, etc. In this example, the $\text{Entity}_{Id}$ can be an iNode value, a file descriptor, an object identifier, key/value identifier, etc. In one embodiment, an input to a storage operation is the $\text{Entity}_{Id}$ and the offset (e.g., a write, read, query, create, delete, etc. operations). In this embodiment, the $\text{Entity}_{Id}$ is a globally unique identification.

In one embodiment, the StorFS 100 system receives the $\text{Entity}_{Id}$ and offset as input for each requested storage operation from an application 106A-C. In this embodiment, the StorFS system 100 uses the offset to compute a stripe unit number, Stripe_Unit#, based on the stripe unit size, Stripe_Unit_Size, and the number of virtual nodes that the entity can be spread across, Stripe_Unit_Per_Stripe. Using the stripe unit number and the entity identifier ($\text{Entity}_{Id}$), the StorFS system 100 computes the virtual node identifier. As described below, the StorFS system 100 uses a hash function to compute the virtual node identifier. With the virtual node identifier, the StorFS 100 can identify which physical node the storage entity is associated with and can route the request to the corresponding SC server 110A-C.

In one embodiment, each vNode is a collection of either one or more data or metadata objects. In one embodiment, the StorFS system 100 does not store data and metadata in the same virtual node. This is because data and metadata may have different access patterns and quality of service (QoS) requirements. In one embodiment, a vNode does not span across two devices (e.g. a HDD). A single storage disk of a storage node 102A-C may contain multiple vNodes. In one embodiment, the placement function uses that a deterministic hashing function and that has good uniformity over the total number of virtual nodes. A hashing function as known in the art can be used (e.g., Jenkins hash, murmur hash, etc.). In one embodiment, the "Stripe_Unit_Per_Stripe" attribute determines the number of total virtual nodes that an entity can be spread across. This enables distributing and parallelizing the workload across multiple storage nodes (e.g., multiple SC servers 110A-C). In one embodiment, the StorFS system 100 uses a two-level indexing scheme that maps the logical address (e.g. offset within a file or an object) to a virtual block address (VBA) and from the VBAs to physical block address (PBA). In one embodiment, the VBAs are prefixed by the ID of the vNode in which they are stored. This vNode identifier (ID) is used by the SC client and other StorFS system 100 components to route the I/O to the correct cluster node. The physical location on the disk is determined based on the second index, which is local to a physical node. In one embodiment, a VBA is unique across the StorFS cluster, where no two objects in the cluster will have the same VBA.

In one embodiment, the cluster manager (CRM) maintains a database of virtual node (vNode) to physical node (pNode) mapping. In this embodiment, each SC client and server caches the above mapping and computes the location of a particular data block using the above function in Equation (1). In this embodiment, the cluster manager need not be consulted for every I/O. Instead, the cluster manager is notified if there is any change in 'vNode' to 'pNode' mapping, which may happen due to node/disk failure, load balancing, etc. This allows the StorFS system to scale up and parallelize/distribute the workload to many different storage nodes. In addition, this provides a more deterministic routing behavior and quality of service. By distributing I/Os across different storage nodes, the workloads can take advantage of the caches in each of those nodes, thereby providing higher combined performance. Even if the application migrates (e.g. a virtual machine migrates in a virtualized environment), the routing logic can fetch the data from the appropriate storage nodes. Since the placement is done at the stripe unit granularity, access to data within a particular stripe unit goes to the same physical node. Access to two different stripe units may land in different physical nodes. The striping can be configured at different level (e.g. file, volume, etc.) Depending on the application settings, the size of a stripe unit can range from a few megabytes to a few hundred megabytes. In one embodiment, this can provide a good balance between fragmentation (for sequential file access) and load distribution.

Figure 2:
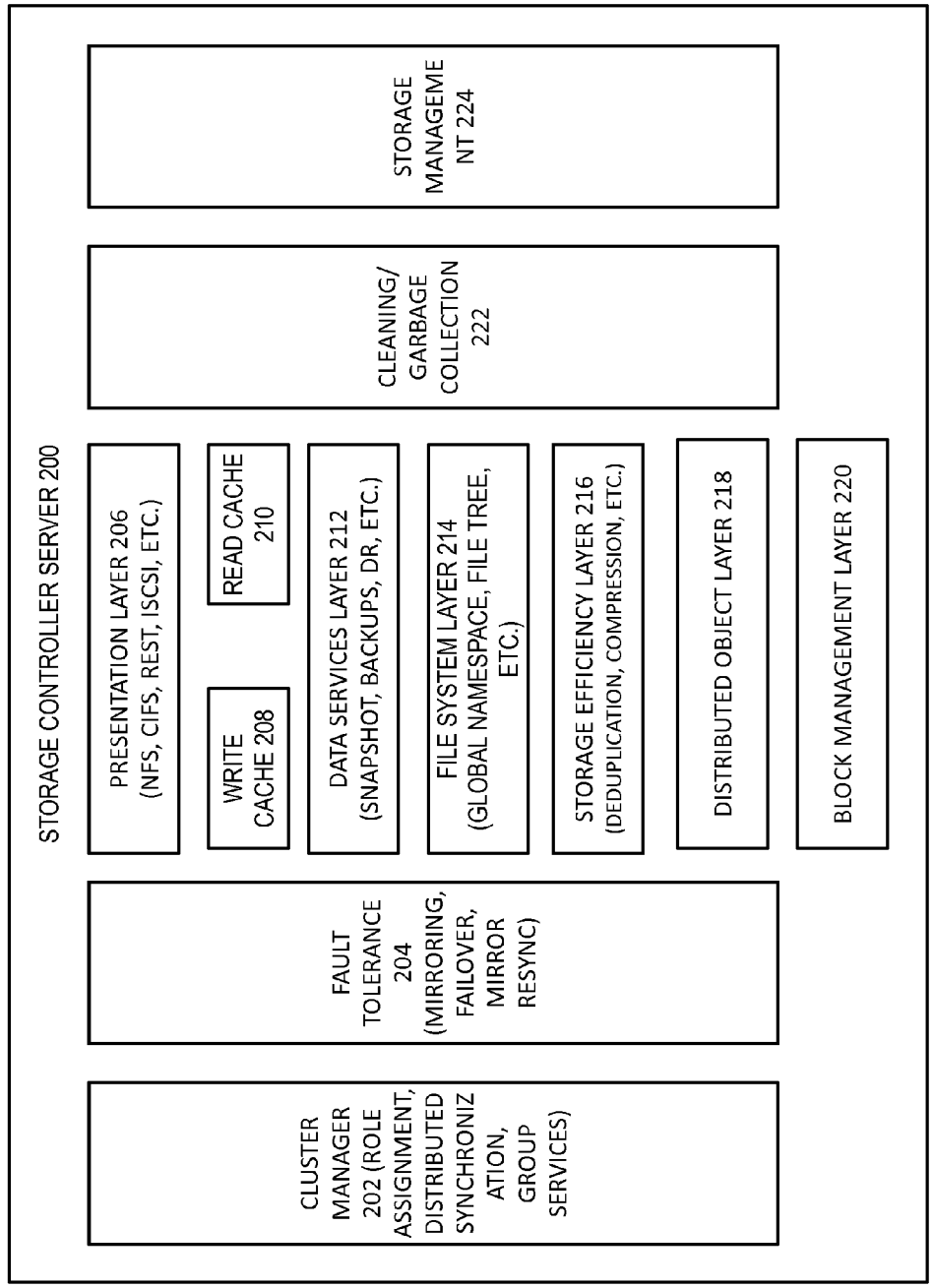
FIG. 2 is an illustration of one embodiment of a system including some of the components that comprises the storage controller server.

FIG. 2 is a block diagram of one embodiment of a storage control server 200. In one embodiment, the Block Management Layer 220 of the storage control server is responsible for formatting, allocating, and freeing storage in fixed block sizes. This layer provides access to different kinds of storage (e.g. SSD, HDD, etc.) in the system. In one embodiment, the Distributed Object Layer 218 of the storage control server uses an API of the Block Management Layer 220 to provide a global distributed object namespace that is accessible over the network. In one embodiment, the Storage Efficiency Layer 216 reduces the size of data footprint on the physical medium using techniques like compression, deduplication, etc. The reduction is achieved without deteriorating the performance or the reliability of the data storage. In one embodiment, the File System Layer 214 provides a logical global namespace abstraction to organize and locate data in the cluster. In one embodiment, the Data Service Layer 212 provides enterprise data services like disaster recovery, fine grained policy management, snapshots/clones, etc. In one embodiment, the Write Cache 208 and the Read Cache 210 Layers provide acceleration for write and read I/O respectively using fast storage devices. In one embodiment, the Write Cache Layer 208 includes the write log as described below. In one embodiment, the Presentation Layer 206 provides an interface to access the StorFS storage using well-known standard protocols like NFS, CIFS, REST, iSCSI, etc. In one embodiment, the Cluster Manager (CRM) Layer 202 is responsible for the coordination across distributed StorFS components, delegating responsibilities and maintaining a consistent global state of the system. In one embodiment, the Fault Tolerance Layer 204 is responsible for resiliency and making sure that the data is available and consistent even after the failure of a software or hardware component (disk, server, network, etc.). In one embodiment, the Garbage Collection Layer 222 is responsible for reclaiming dead space that result due to entities getting deleted or updated. This layer efficiently determines the storage blocks that are not used (or referenced) and makes them available for new data to be written. In one embodiment, the Storage Management Layer 224 provides a framework to configure, monitor, analyze and report on the operation of the overall StorFS cluster storage system as well as individual logical and physical entities in the cluster. In one embodiment, each of the layers mentioned above are fully distributed and each layer does not rely on any centralized components for their operations.

In another embodiment, the StorFS system uses the concept of virtual node (vNode) as the unit of data routing and management. In one embodiment, there are four types of vNode:

Namespace vNode: A vNode that is associated with the routing and storage of the StorFS file system namespace (directory structure, file names, etc.) metadata.

FileTree vNode: A vNode that is associated with the routing and storage of the StorFS 'File Tree' metadata. File tree metadata is used to locate the data on the persistent storage.

Data vNode: A vNode that is associated with the routing and storage of the data

Cache vNode: A vNode that is associated with the routing of the client IOs from SC client to one of the SC servers. Multiple cache vNodes are grouped together to form an abstraction called 'Write Log Group', where updates from the clients are logged.

Namespace and FileTree vNodes are collectively called metadata vNodes. In one embodiment, there is a one-to-one correspondence between the metadata vNodes and the cache vNodes; i.e. for every metadata vNode, there exists one and only one cache vNode. In another embodiment, there can be a many to one relationship between data vNodes and metadata vNodes. The number of metadata and cache vNodes is specified as a configuration parameter during the cluster creation and this number remains fixed for the entire lifecycle of the cluster. For the purpose of resiliency and high availability, the StorFS system introduces enough redundancy (e.g., RAID-1) to recover from failures. The redundancy level is configurable based on user-defined policies. Cache vNodes can only be placed on storage devices that allow fast random access like SSD, flash, NVRAM, etc. Data and metadata vNodes can be placed on any non-volatile persistent storage like HDD, SSD, etc.

In one embodiment, the cluster resource manager (CRM) 202 maintains a database of virtual node (vNode) to physical node (pNode) mapping. In this embodiment, each SC client and server caches the above mapping and computes the location of a particular data block using the above function in Equation (1). In this embodiment, the cluster manager need not be consulted for every I/O. Instead, the cluster manager is notified if there is any change in 'vNode' to 'pNode' mapping, which may happen due to node/disk failure, load balancing, etc. This allows the StorFS system to scale up and parallelize/distribute the workload to many different storage nodes. In addition, this provides a more deterministic routing behavior and quality of service. By distributing I/Os across different storage nodes, the workloads can take advantage of the caches in each of those nodes, thereby providing higher combined performance. Even if the application migrates (e.g. a virtual machine migrates in a virtualized environment), the routing logic can fetch the data from the appropriate storage nodes. Since the placement is done at the stripe unit granularity, access to data within a particular stripe unit goes to the same physical node. Access to two different stripe units may land in different physical nodes. The striping can be configured at different level (e.g. file, volume, etc.) Depending on the application settings, the size of a stripe unit can range from a few megabytes to a few hundred megabytes. In one embodiment, this can provide a good balance between fragmentation (for sequential file access) and load distribution.

As described above, the physical storage associated with each node in the cluster is partitioned into logical storage vNodes. On a high level dynamic load balancing is achieved by dealing directly with vNodes, in the cluster by aiming at keeping the "in use" vNodes balanced at all times as much as possible. The Cluster Resource Manager Master (CRM-Master) is responsible for monitoring cluster resources (pNodes, and their disks), and invoking load balancer at appropriate times to allocate or rebalance these vNodes. However, the StorFS system does dynamic resource allocation as opposed to large static allocation over all the resources available. By employing dynamic resource allocation, load balancing optimizes allocation of vNodes based on available resources at a given time rather than doing statically. In one embodiment, vNode allocation and rebalancing is handled at cluster creation and dynamically during the cluster operation.

Figure 3:
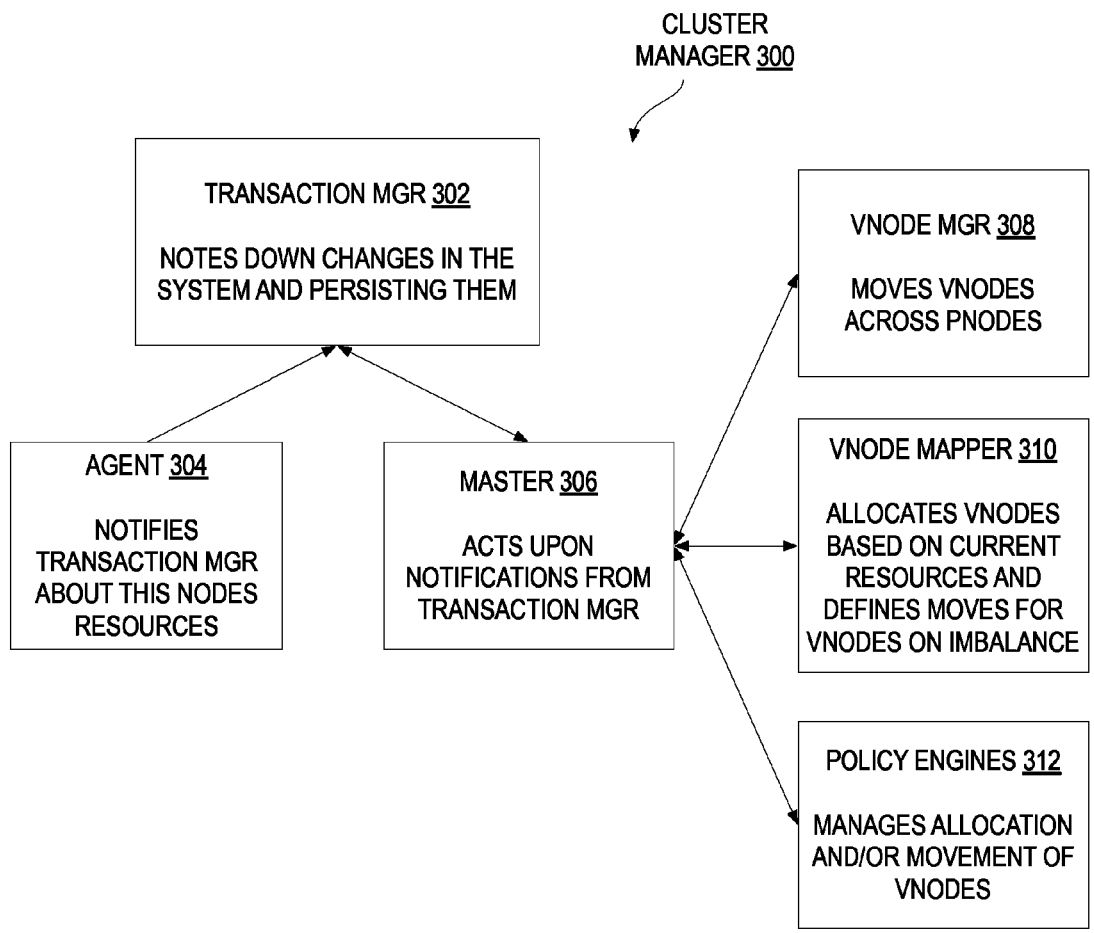
FIG. 3 is a block diagram of one embodiment of a cluster manager.

At the time of cluster creation, the StorFS system creates some static vNodes that store the metadata associated with the cluster and the data to be stored in the StorFS system. These static vNodes are created out of the resources available at the time of cluster creation once CRM establishes that the policy requirements are met after consulting with the policy engine. In one embodiment, the policy engine is responsible for making decisions based on current system resources and the state of CRM-Master whether auto load balancing is required at this time. The policy engine is described in FIG. 3 below. In one embodiment, the policy engine is responsible for making decision whether some actions are required and if so, what action is required. In one embodiment, the actions the policy engine may take are one of the following: (i) "static vNode allocation required"; (ii) "cache vNode movement required"; (iii) "data vNode movement required"; (iv) "unsafe to allow cluster operations"; or (v) No action required.

Figure 4:
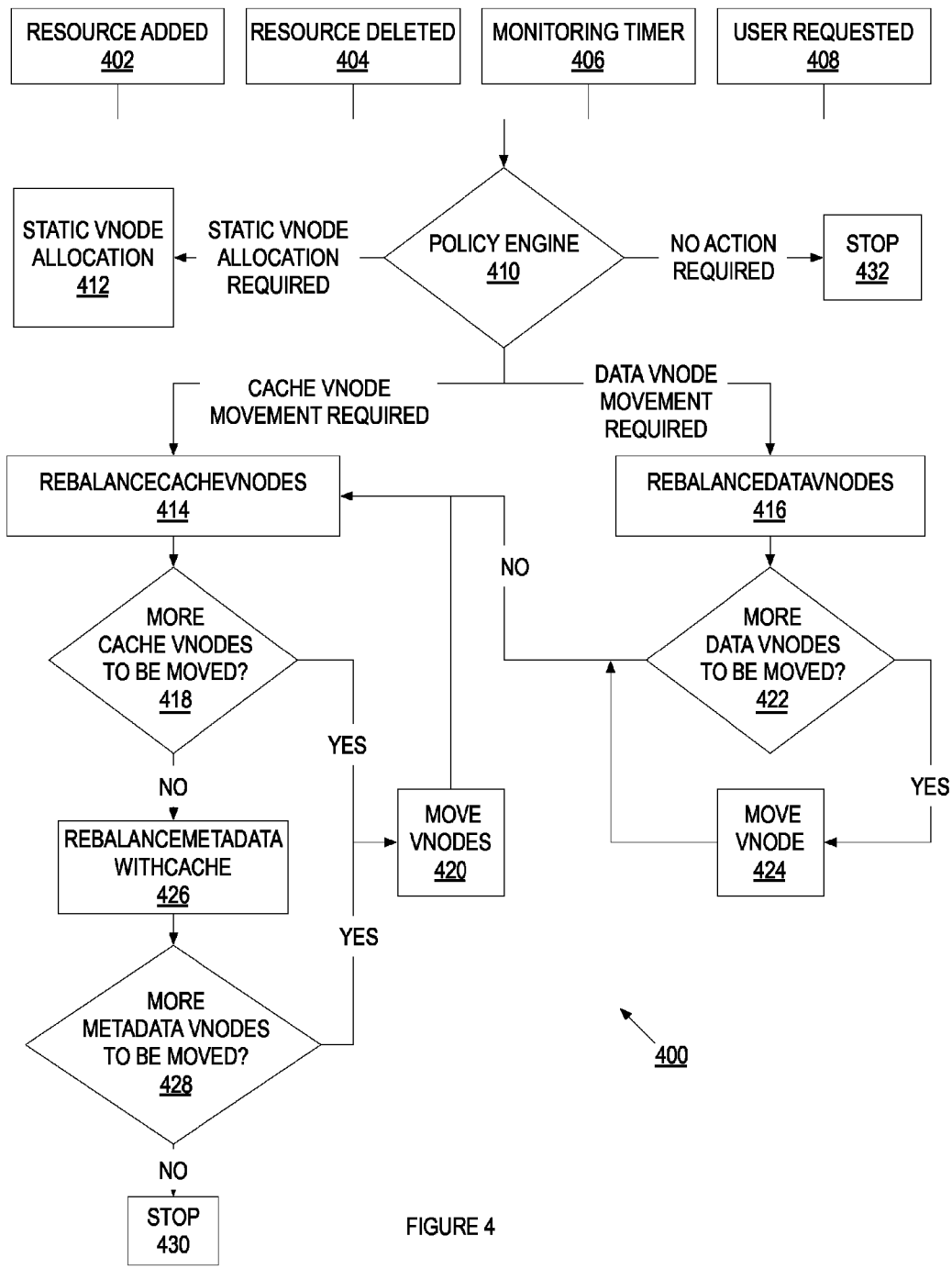
FIG. 4 is a flow diagram of one embodiment of a process to perform load balancing.

FIG. 4 is a block diagram of one embodiment of a cluster manager 202. In FIG. 4, the cluster manager 200 includes transaction manager 302, agent 304, master 306, vNode manager 308, vNode mapper 310, and policy engine 312. In this embodiment, the agent 304 and master 306 are coupled to the transaction manager 302. Furthermore, the Master 306 is coupled to the vNode manager 308, the vNode mapper 310, and the policy engine 312. In one embodiment, the transaction manager 302 notes down changes in the system and persisting them. In one embodiment, persisting the changes means storing in such a way that it is retrievable even after node failures (crashes. power loss, and/or another type of node failure.) In one embodiment, the agent 304 notifies the transaction manager 302 about the node's resources. In one embodiment the master 306 acts upon notifications from the transaction manager 302. In one embodiment, the vNode manager 308 moves the vNodes across pNodes. In this embodiment, a vNode can be resident on one pNode and is moved to a different pNode depending on the conditions in the distributed file system. For example and in one embodiment, pNode1 may become overloaded or over-utilized with many different vNodes. In this embodiment, the vNode manager would move one of the vNodes from pNode1 to a different pNode (e.g., pNode2) so as to balance the number of the vNodes across those different pNodes. In one embodiment, the vNode mapper 310 locates pNodes based on current resources and defines moves for the vNodes as a result of an imbalance. In one embodiment, the policy engine 312 computes answers to questions and responds with "Yes/No." In this embodiment, other component or modules use the policy engine decisions to act on a given event (resource addition/deletion/timeout, etc.).

FIG. 4 is a flow diagram of one embodiment of a process 400 to perform load balancing. In FIG. 4, process 400 begins by detecting one or more of the events as described in blocks 402, 404, 406, and/or 408. In one embodiment, process 400 detects that a resource has been added to the StorFS system at block 402. In one embodiment, a resource that added can be a new pNode, one or more disks added to an existing pNode, an existing pNode or disk of a pNode that was down and has recovered, or some other resource that adds to the capacity of StorFS system. If a resource is added or is now available at block 402, execution proceeds to block 410 below. At block 404, process 400 determines that a resource of the StorFS system has been deleted. In one embodiment, a deleted resource can be a deleted or is unavailable pNode, a disk of a pNode, or another resource of StorFS system that is down or deleted that reduces the capacity of the StorFS system. If process 400 detects a resource has been deleted or is unavailable, execution proceeds to block 410 below. At block 406, process 400 monitors one or more timer. In one embodiment, a monitoring timer is a timer that is used by process 400 to determine changes in a component of the StorFS system. In one embodiment, a monitoring timer is used to monitor the statistics of the StorFS system. In this embodiment, the statistics can be used to determine if there is an imbalance in the StorFS system. Execution proceeds to block 410 below. At block 408, process 400 detects a user request to modify the configuration of the StorFS system. In one embodiment, a user request to modify the configuration of the policy engine can be a request to allocate additional vNodes, move a vNode from one pNode to another pNode, deletion of one or more vNodes, or another type of user configuration request that the policy engine can process. Execution proceeds to block 410 below.

At block 410, process 400 uses the policy engine to determine what action should be performed in response to one of the events detected at blocks 402, 404, 406, and 408 above. In one embodiment, process 400 uses the policy engine to perform resource addition, resource deletion, or processing a monitored timer. In one embodiment, performing a resource addition is further described in FIG. 5A below. In one embodiment, performing a resource deletion is further described in FIG. 5B below. In one embodiment, monitoring a timer is further described in FIG. 5C below. In one embodiment, process 400 can determine what various actions are required. In this embodiment, actions that can be performed are static vNode allocation, cache vNode movement, and/or data vNode movement. If a static vNode allocation is required, execution proceeds to block 412 below. If a cache vNode movement is required, execution proceeds to block 414 below. If a date of vNode movement is required, execution proceeds to block 416 below. If no action is required, process 400 stops at block 426.

At block 412, process 400 performs a static vNode allocation. In one embodiment a static vNode allocation is performed if a resource is added, if policy constraints are met. The policy could be user specified. For example and in one embodiment, a policy constraint is that "there are N pNodes having at least 1 HDD and 1 SSD in the system." At block 414, process 400 performs a rebalance cache vNode. In one embodiment the rebalance cache vNode is performed when process 400 determines that a cache vNode movement is required. A rebalance cache vNode is further described in FIG. 9 below. At block 418, process 400 determines if more cache vNodes are to be moved. If more cache vNodes are to be moved, process 400 moves to vNodes at block 420. Execution proceeds to block 414 above. If there are no more cache vNodes to be moved, process 400 performs a rebalance metadata with cache at block 426. In one embodiment, this action moves the metadata vNodes along with the cache vNodes from one pNodes to another pNode. The rebalance metadata with cache is further described in FIG. 10 below. At block 428, process 400 determines if there are more metadata vNodes to be moved. If there are more metadata vNodes to be moved, execution proceeds to block 420 above, where the process 400 moves those vNodes. If there are not any more metadata be notes to be moved, process 400 stops at block 430.

At block 416, process 400 performs a rebalance of data vNodes. In one embodiment, a rebalance data vNodes is performed by process 400 if one or more data vNodes need to be moved. The rebalance of data vNode is further described in FIG. 11 below. At block 422, process 400 determines if there are more data vNodes to be moved. If there are more data vNodes to be moved, process 400 moves those data vNodes at block 424. Execution proceeds to block 422 above. If there are no more data vNodes to be moved, execution proceeds to block 414 above.

Figure 5A:
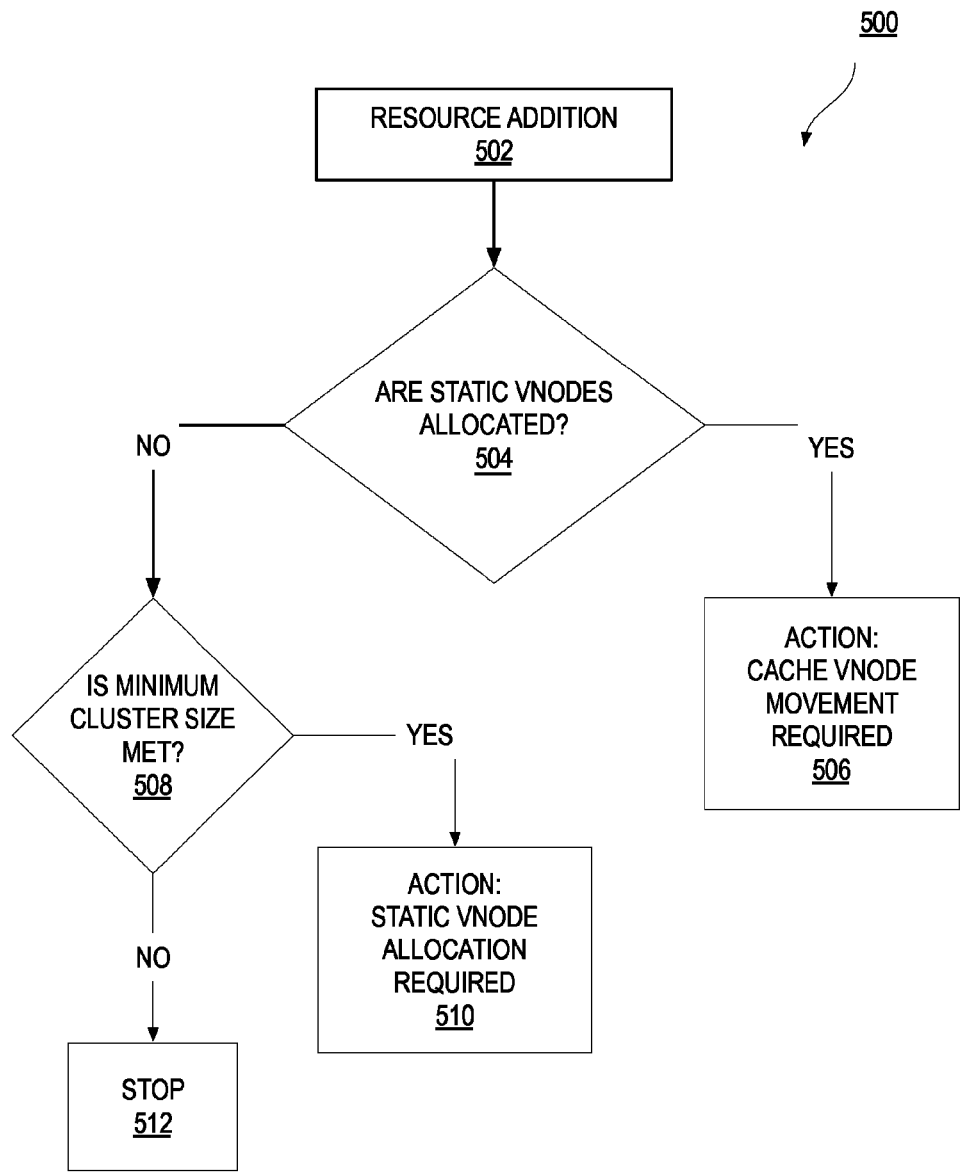
FIGS. 5A-C are flow diagrams of one embodiment of policy processes.
Figure 5B:
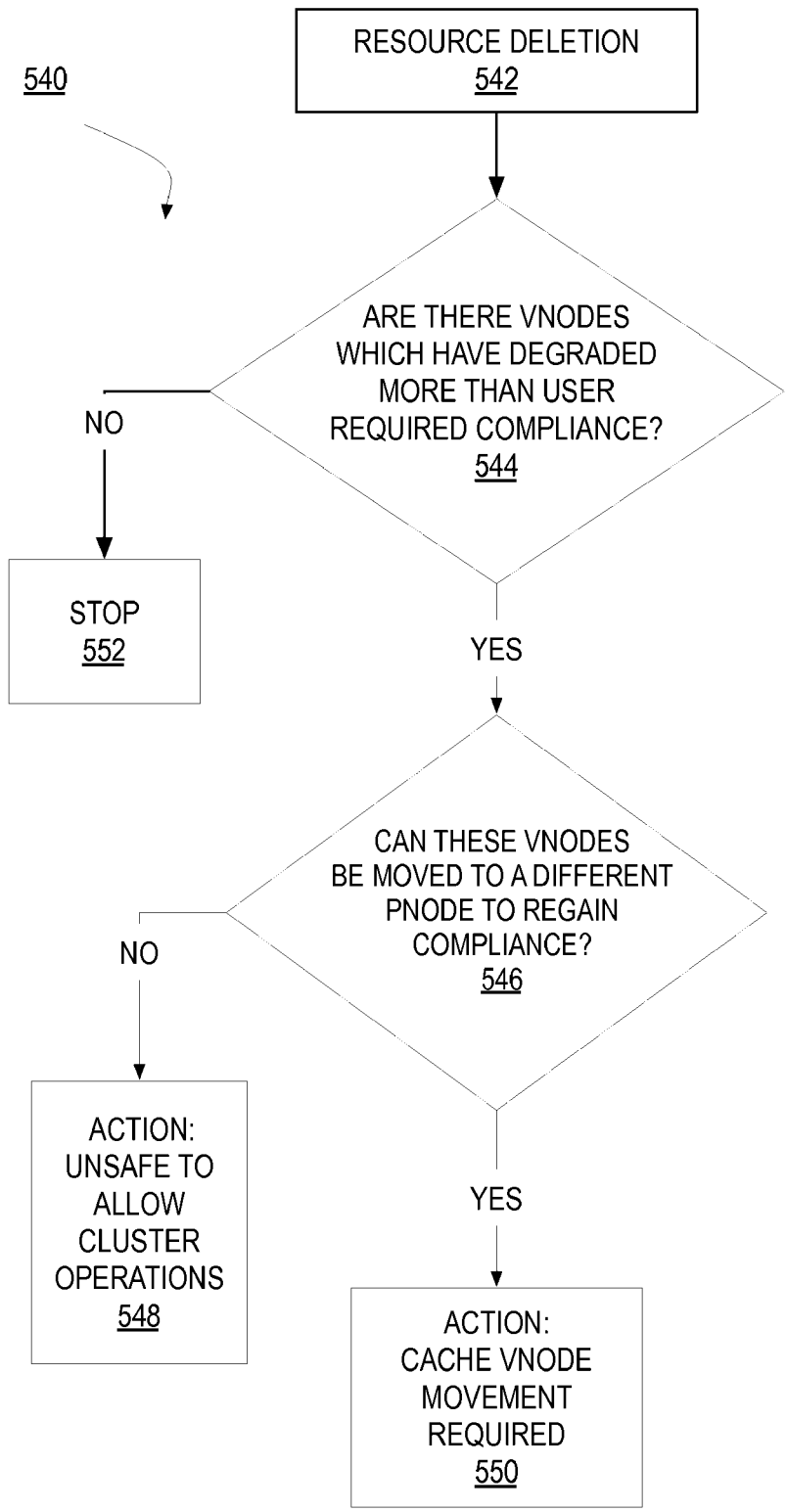
Figure 5C:
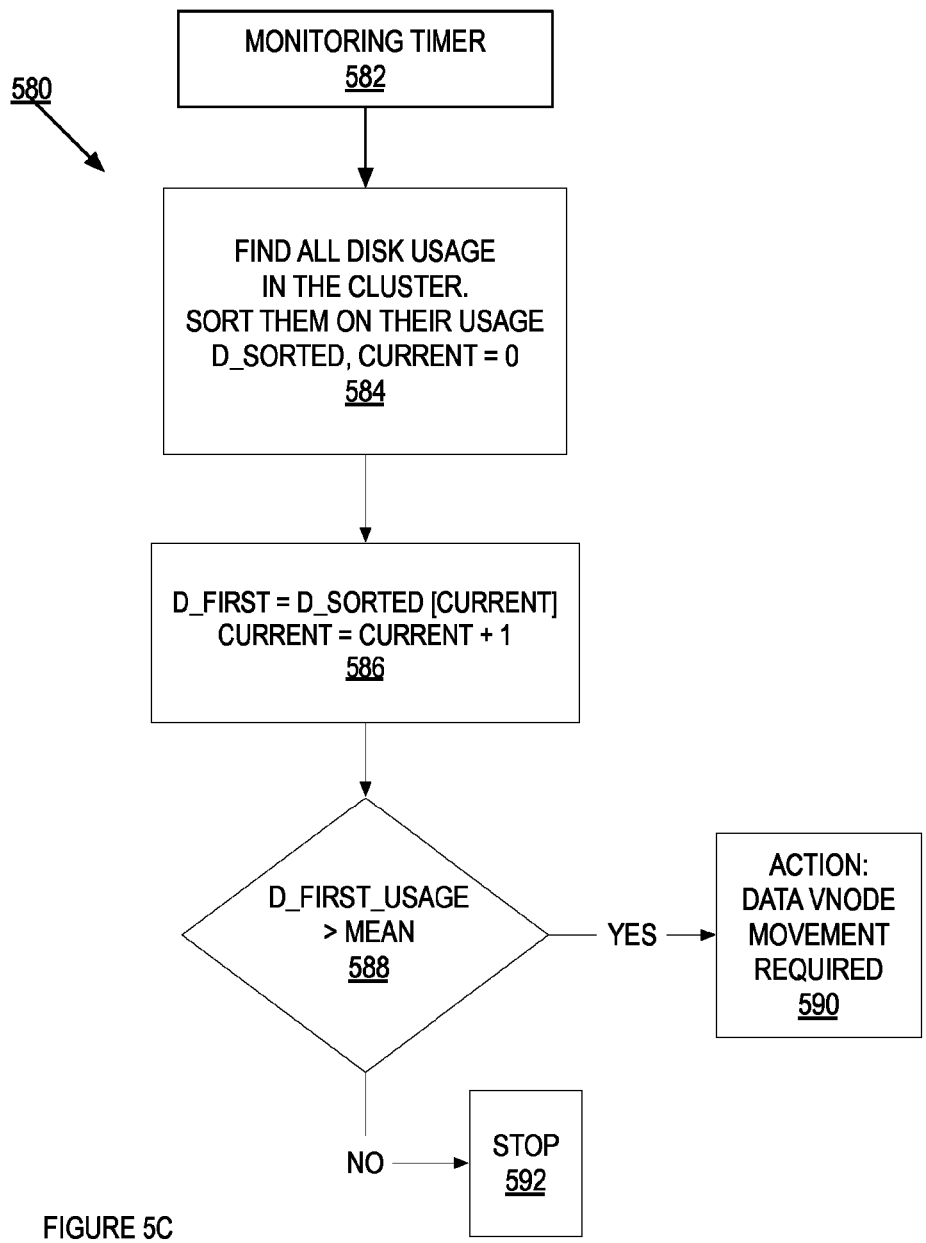

FIGS. 5A-C are flow diagrams of one embodiment of policy processes. In one embodiment, the processes described in FIGS. 5A-C are performed by a policy engine, such as the policy engine 412 of FIG. 4 above. In one embodiment, process 500 manages resource addition, process 540 manages resource deletion, and process 580 monitor timers. In FIG. 5A, process 500 begins by receiving a resource addition request at block 502. A block 504, process 500 determines if there are statically vNodes that are allocated. In one embodiment, a static vNode is a vNode that which stores metadata associated with actual user data. In one embodiment, the static vNodes are fixed in numbers and therefore called static vNodes. If there are static vNodes allocated, process 500 determines that a cache vNode movement is required. In one embodiment, the cache vNode movement is performed as described in FIGS. 6-8 below. If there are not any static vNodes allocated, at block 508, process 500 determines if there is a minimum cluster size that is met. In one embodiment, a minimum cluster size is a constraint/policy parameter which dictates the minimum # of physical nodes running the distributed storage system. If the minimum cluster size is not met, process 500 stops at block 512. If the cluster minimum size is met, process 500 allocates a static vNode at block 510. In one embodiment, the vNode mapper as described in FIG. 4 performs static vNode allocation.

In FIG. 5B, process 540 receives a resource deletion request at block 542. At block 544, process 540 determines if there are vNodes that have degraded more than the user required compliance. For example and in one embodiment, a vNode may degrade because each vNode can have replicas. For example and in one embodiment, a vNode may have two or three wide configuration parameters) for data redundancy to account for failures. These replicas are chosen such that they come from different pNode and disk on that pNode to keep the fault domains of replicas separate (such that if one goes bad data could still be retrieved from other replica). A pNode/Disk failure causes replicas to become unavailable and thus the vNode to become degraded. If there are not any of the vNodes that have degraded, more than the user required compliance, process 540 stops at block 552. In one embodiment, a user required compliance is the number of replicas that the user would want to be available at all times. Some users may require just one replica. Others may need more than one replica to be available at all times. If there is a vNode that is degraded more than the user required compliance, process 540 determines if these the vNodes can be moved to a different pNode to regain compliance at block 546. If these pNodes can be moved, process 500 performs a cache vNode movement at block 550. If the vNodes cannot be moved, process 540 determines that it is unsafe to allow cluster operations at block 548. In one embodiment, process 540 returns an error code indicating that cluster is unstable.

In FIG. 5C, process 580 begins by monitoring the timers of block 582. In one embodiment, process 580 monitors timers that are used for statistics collection. In this embodiment, process 580 collects statistics regarding the StorFS system usage and uses these statistics to determine if there is an imbalance in the system that could trigger a rebalancing action. At block 584, process 500 finds the disk usage in the cluster. Process 580 additionally sorts the usage of each disk into the array d_sorted and sets the variable current equals zero. Process 580 additionally sets d_first equal to d_sorted [current] and sets current equal to current+1. At block 588, process 580 determines if d_first_usage is greater than the mean. In one embodiment, the mean is the ratio of the total disk usage to the total capacity. If d_first_usage is greater than the mean, process 580 determines that a data vNode movement is required at block 590. In one embodiment, the required data vNode movement moves a data vNode from the disk d_first_usage to an underutilized disk. If d_first_usage is not greater than the mean, process 580 stops at block 592. In one embodiment, disk_first is the disk with minimum usage. In addition, disk_first_usage is the value of that usage (the disk usage value of the disk which is minimally used in the cluster). For example and in one embodiment, if there are 3 disks in the system with usage as 10 GB occupied/used for Disk1, 15 GB occupied/used for Disk2, 18 G occupied/used for Disk3. Then 10 GB, 15 GB, 18 GB are the disk usage for Disk1, Disk2 and Disk3 respectively. In this example, disk_first is Disk1 since its usage is least and disk_first_usage is 10 G. In addition, the cluster mean (or just mean) in this case is 10+15+18/3=43/3=14.33 GB In one embodiment, the Master 406 employs load balancing algorithms, part of "vNode Mapper" engine, at the time of cluster creation to evenly distribute the vNodes across the hosts and disks. In one embodiment, the load balancing happens as a result of the Policy Engine 412 coming out with an action of "static vNode allocation required." The overall process is described in FIG. 6 below. In one embodiment, there are two types of static vNodes used: metadata vNodes and cache vNodes. In this embodiment, metadata vNodes are allocated from persistent class storage medium (HDD, SSD, etc.). Cache vNodes caches the information in the metadata vNodes for faster access and also cache the associated user data temporarily (until it is flushed to the persistent medium). Because of the caching nature of the cache vNodes, cache vNodes are allocated from the caching class storage medium (SSD, Flash, etc.). In one embodiment, the load balancing algorithms are used at the time of cluster creation. The uniform distribution of cache vNodes allows for load balanced nodes in terms of compute needs and uniform distribution of metadata vNodes ensure load balanced nodes in terms of storage.

Figure 6:
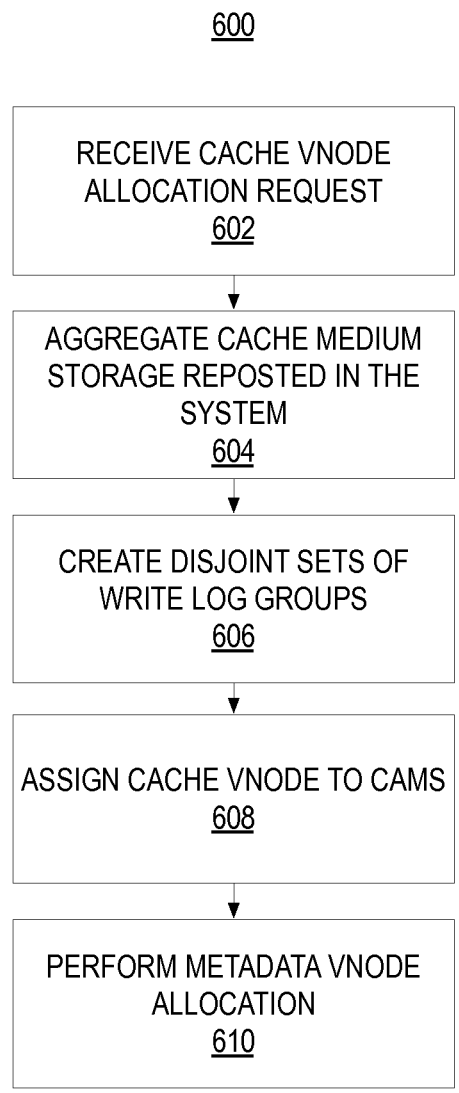
FIG. 6 is a flow diagram of one embodiment of a process to allocate cache vNodes.

FIG. 6 is a flow diagram of one embodiment of a process 600 to allocate cache vNodes. In FIG. 6, process 600 begins by receiving a vNode mapper cache vNode allocation request at block 602. In one embodiment, process 600 would receive this request from a policy engine, such as the policy engine 412 of FIG. 4 above. At block 604, process 600 aggregates the cache medium storage reposted in the system. In one embodiment, each pNode reports its disks and their partitions as write log groups. In one embodiment, a write log group is a group of write logs that are stored on that disk. Process 600 creates disjoint sets of write log groups at block 606. In one embodiment, these write log groups are such that each set contains a cache active mirror set (CAMS) of Equation (2), $$[<P_a, D_{i\_a}, WL_{x\_i\_a}>, <P_b, D_{i\_b}, WL_{x\_i\_b}>, \ldots] \quad (2)$$

where $P_a$, $P_b$, ..., are the P nodes in the system. In addition, $D_{i\_a}$, $D_{i\_b}$, etc., are the cache medium disk on $P_a$, $P_b$, etc., respectively. $WL_{x\_i\_a}$, $WL_{x\_i\_b}$, etc., are the write log groups on disks $D_{i\_a}$, $D_{j\_b}$, etc., respectively. In one embodiment, each set contains as many members as a replication factor of the cash fee notes. For example in one embodiment, if the cache on the nodes are to be replicated three times each of the CAMS would contain three members. At block 608, process 600 assigns a cache vNode $C_i$ to $CAMS_p$, where p=(# of $CAMS_{e3}$) % r, for in 0→# of cache vNodes. At block 610, process 600 allocates a metadata vNode for this cache vNode. Allocating a metadata vNode is further described in FIG. 7 below.

In one embodiment, different techniques can be employed for distributing metadata vNodes as opposed to cache vNodes because of a difference in how persistent medium and caching medium disks are formatted. In one embodiment, the load distribution algorithm for metadata vNodes tries to collocate (e.g., are located on the same physical node) the metadata vNodes with corresponding cache vNode for improved read performance and write throughput. If such vNodes cannot be collocated then they are allocated on a next best possible pNodes.

Figure 7:
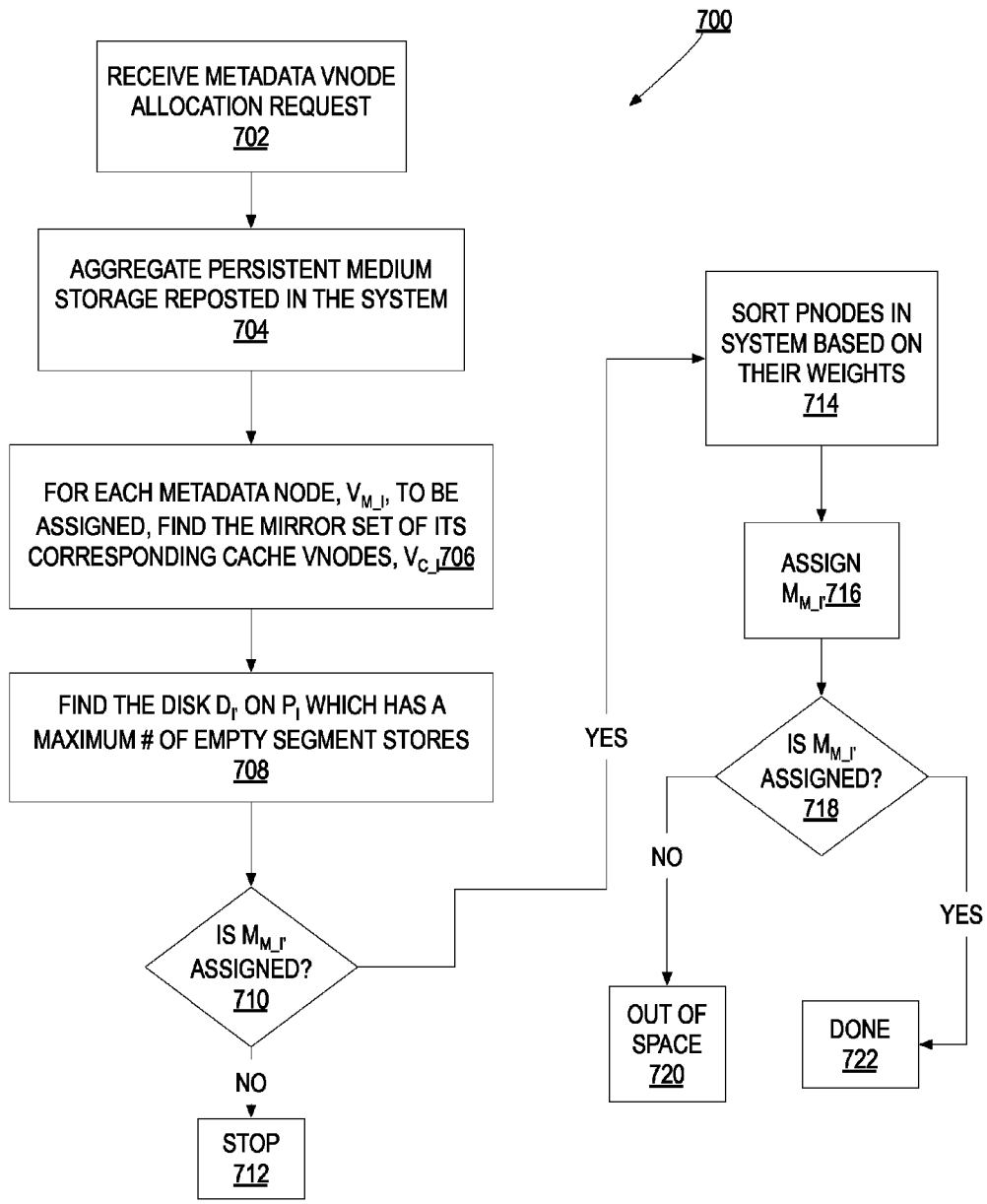
FIG. 7 is a flow diagram of one embodiment of a process to allocate metadata vNodes.

FIG. 7 is a flow diagram of one embodiment of a process 700 to allocate metadata vNodes. In FIG. 7, process 700 begins by receiving a vNode allocation request at block 702. In one embodiment, a vNode allocation request is received by process 700 when a corresponding cache vNode allocation is created. At block 704, process 700 aggregates the persistent medium storages that are reposted in the system. In one embodiment, each disk in the StorFS system reposts the partitions as a segment store. In this embodiment, the mediums reporting such segment stores are used.

At block 706, process 700 finds, for each metadata vNode, $V_{m\_i}$, to be assigned, the mirror set of its corresponding cache vNode, $V_{c\_i}$, such that $V_{c_i}=(<P_1, T_1, WL_1>, <P_2, D_2, WL_2>, \ldots, <P_k, D_k, WL_k>)$. In one embodiment, $M_{c\_i}$, which is the mirror for cache vNode, $V_{c\_i}$, is $<P_i, D_i, WL_i>$. Process 700 finds the disk $D_{i'}$ on $P_i$ which has the maximum number of empty segment stores at block 708. Assume the empty segment store number is $S_{i'}$. Process 700 assigns the $M_{m\_i'}$ as $<P_i, D_{i'}, S_{i'}>$. If no disks with empty segment stores are found on $P_i$, $M_{m\_i'}$ is set to an unassigned segment store. At block 710, process 700 determines is $M_{m\_i'}$ is unassigned. If $M_{m\_i'}$ is unassigned, process 700 stops at block 712.

If $M_{m\_i'}$ is assigned, process 700 sorts through the pNodes in the system based on the weights of the pNodes. In one embodiment, a pNode weight is defined to be a metric based on characteristics that order these pNodes in a priority order. A pNode with better weight will be higher in priority for example. In one embodiment, the pNode weight is equal to the $\Sigma_{d\_i=0}^{n}$ (#of empty segment stores on disk d_i). At block 716, process 700 assigns $M_{m\_i'}=<P_i, D_i, S_i>$ such that $P_{i'}$ is the pNode with the maximum weight, having a disk $D_i$, having an empty segment store $S_{i'}$. If no such pNode and disk are found, $M_{m\_i'}$ is set as unassigned. At block 718, process 700 determines if $M_{m\_i'}$ is unassigned. If $M_{m\_i'}$ is unassigned, at block 720, process 700 determines that the system is out of space. In one embodiment, process 700 returns an error code indicating that the system is out of space. If $M_{m\_i'}$ is assigned, at block 722, process 700 determines that the metadata of the vNode allocation is done. In this embodiment, process 700 returns an indication that the vNode metadata was allocated and that this process is completed.

Figure 8:
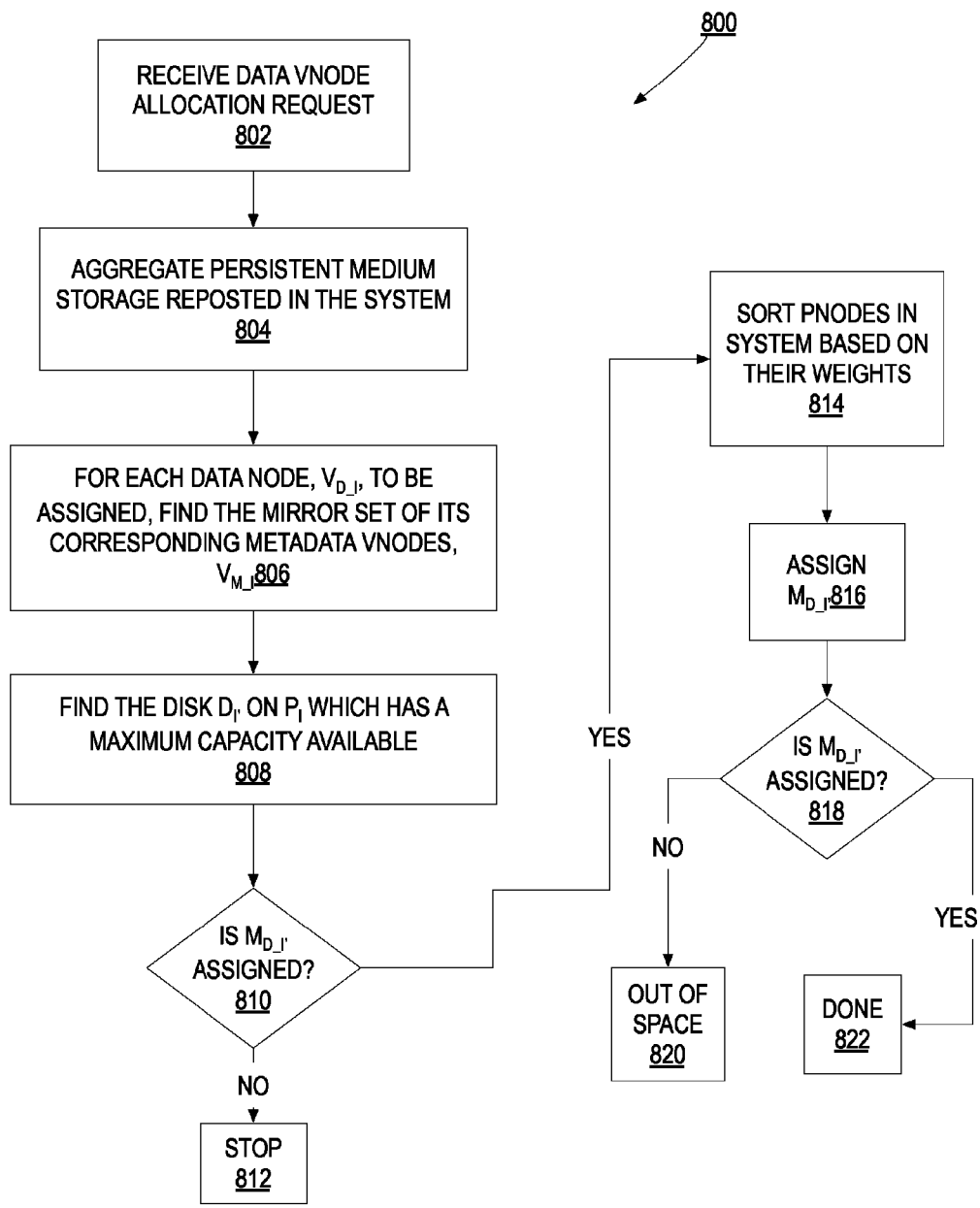
FIG. 8 is a flow diagram of one embodiment of a process to allocate data vNodes.

As and when more data is written into the cluster, the load balancing algorithm partitions additional space in the cluster for new data and uses this additional space to allocate new data vNodes. In one embodiment, data vNodes are allocated in a persistent medium (e.g., SSD, HDD, etc.). In this embodiment, new data vNodes are allocated in such a way that the existing storage nodes are kept in balance in terms of their overall disk usage. FIG. 8 is a flow diagram of one embodiment of a process 800 to allocate data vNodes. In FIG. 8, process 800 receives a data vNode allocation request a block 802. In one embodiment, process 800 receives the data vNode allocation as the result of a cluster imbalance as described in FIGS. 3 and 5C above. At block 804, process 800 aggregates the persistent medium storages that are reposted in the system. In one embodiment, each disk in the StorFS system reposts the partitions as a segment store. In this embodiment, the mediums reporting such segment stores are used.

At block 806, process 800 finds, for data vNode, $V_{d\_i}$, to be assigned, the mirror set of its corresponding metadata vNode, $V_{d\_i}$, such that $V_{d\_i}=(<P_1, D_1, S_1>, <P_2, D_2, S_2>, <P_k, D_k, S_k>)$. In one embodiment, which is the mirror for metadata vNode, $V_{m\_i}$, is $<P_i, D_i, S_i>$. Process 800 finds the disk $D_{i'}$ on $P_i$ which has the maximum capacity at block 808. In one embodiment, the maximum capacity is measured in terms of disk usage. Assume the empty segment store number is $S_{i'}$. Process 800 assigns the $M_{d\_i'}$ as $<P_i, D_{i'}, S_{i'}>$. If no disks with empty segment stores are found on $P_i$, $M_{d\_i'}$ is set to an unassigned segment store. At block 810, process 800 determines is $M_{d\_i'}$ is unassigned. If $M_{d\_i'}$ is unassigned, process 800 stops at block 812.

If $M_{m\_i'}$ is assigned, process 700 sorts through the pNodes in the system based on the weights of the pNodes. In one embodiment, a pNode weight is a defined to be a metric based on characteristics that order these pNodes in a priority order. A pNode with better weight will be higher in priority for example. In one embodiment, the pNode weight and is equal to the $\Sigma_{d\_i=0}^{n}$ (unused capacity on disk d_i). At block 716, process 700 assigns $M_{m\_i}=<P_i, D_i, S_i>$ such that is the pNode with the maximum weight, having a disk $D_{i'}$ with the maximum unused capacity and an unused segment store $S_{i'}$. If no such pNode and disk are found, $M_{d\_i'}$ is set as unassigned. At block 718, process 700 determines if $M_{m\_i'}$ is unassigned. If $M_{m\_i'}$ is unassigned, at block 720, process 700 determines that the system is out of space. In one embodiment, process

700 returns an error code indicating that the system is out of space. If $M_{d\_i'}$ is assigned, at block 722, process 700 determines that the data vNode allocation is done. In this embodiment, process 700 returns an indication that the vNode data was allocated and that this process is completed.

In the operation of the StorFS system, the cluster storage usage can become imbalanced. For example and in one embodiment, some pNodes may be over utilized whereas other pNodes are underutilized. In this situation, if the use of these vNodes on the over utilized vNodes were to bring the cluster storage usage in imbalance (e.g., as more and more data gets written, in non-deterministic manner), an automated load balancing triggers again to bring the system back in balance. As another example and in another embodiment, as and when new nodes (with additional storage capacity) are added to the cluster, the cluster can be imbalanced, because the new nodes may not be occupied as much as the existing ones. In this embodiment, if capacity on newly added nodes were to be used for data vNodes, this may keep the storage in the cluster balanced. For example and in one embodiment, until the new nodes also become as occupied as the older ones, the load balancing algorithm will keep picking the newly added nodes and their disks for new data vNode allocation. The cluster could still be imbalanced in terms of compute resources because the static vNodes (e.g., cache vNodes) that are allocated at the time of cluster creation were created off the old nodes. To be able to use the caching ability and compute of the newly added nodes, the StorFS system would transfer some of the static vNodes from existing nodes to the newly added nodes. In this embodiment, resource addition, resource unavailability, time monitoring, or user request events can trigger the load balancing actions.

In one embodiment, a resource addition after cluster formation can trigger a load balancing action. In this embodiment, the load balancing that occurs as a result of this event aims at improving the cluster performance. Resource addition can be the addition of a new pNode to the cluster, addition of additional storage medium to an existing pNode, and/or a combination thereof. When a new resource is added, by load balancing static vNodes to the new node, will help direct that I/Os to the newly added node. Balancing the static vNodes can potentially increase the parallelization of the I/Os for better performance. Moreover, the caching medium is brought to its use as early as possible. This is performed by a load balancing action called "RebalanceCacheVNodes" and is further described in FIGS. 9A-B below. Once cache vNodes are rebalanced, the corresponding metadata vNodes are migrated as to bring back the collocation and, hence, improve the performance. This is further described as "RebalanceMetadataWithCache" in FIG. 10 below.

In another embodiment, resource unavailability after cluster formation can trigger another load balancing action. For example and in one embodiment, when a resource is unavailable for a pre-determined time, the resource is considered gone or lost, which would affect the availability factor of the data that resides on that resource. Load balancing techniques are employed at this point to repurpose available storage on remaining nodes such that the replica of data on lost node could be recreated and improve the reliability of the system. This is performed by load balancing action described as "RebalanceCacheVNodes" in FIG. 11 below.

In a further embodiment, the StorFS system uses load balancing techniques to rebalance the cluster from an imbalance state when the system determines that a given node is being used in capacity much more than other nodes (e.g., one of the disk becomes full). In this embodiment, the StorFS system determines this condition by monitoring statistics of node in the system. In addition, load balancing techniques can be used when there are certain number of vNodes that are in non-compliant mode (e.g., nodes are not satisfying service level guarantees like IOps or replication). This is performed by the load balancing actions described as "RebalanceDataVNodes" in FIG. 11 below.

In another embodiment, a user could directly trigger the load balancing techniques if the user decides to evacuate a given node or move one type of workload off a given node for any reason. In such cases the load balancing algorithm used will be a combination of above approaches.

In the above cases of load balancing during normal operation of cluster, the load balancing is a two step process: (i) a rebalancing step and a (ii) a movement step. In one embodiment, the rebalancing step determines which vNodes are to be rebalanced from source pNodes to destination pNodes. In this embodiment, this is an output from one of the above "rebalance" action with the vNode mapper. With the rebalancing mapped, the movement step is carried out by sending a movement request to the current primary of a vNode. In one embodiment, after the movement, the primary of vNode, may or may not be same as the current one. For example, the possible outcomes of such a move for a given vNode is V_i: [P_primary, P_mirror1, P_mirror2]→[P'_primary, P'_mirror1, P'_mirror2] where each of P_primary, P_mirror1 and P_mirror2 could be same or different than P'_primary, P'_mirror1, P'_mirror2 respectively. Which in turn results in partial or complete change of vNode and hence resulting in load balancing.

Figure 9A:
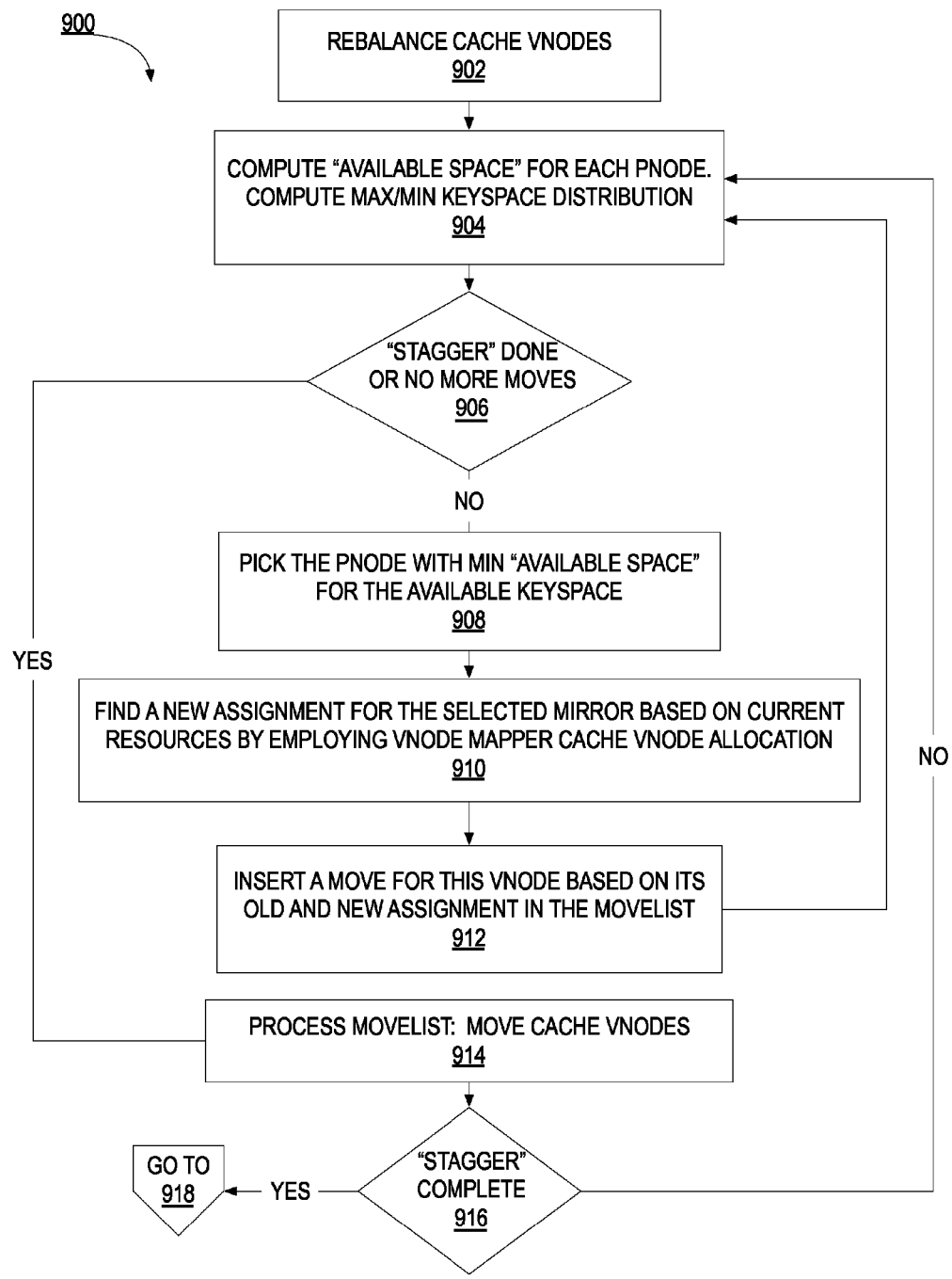

FIGS. 9A-B are flow diagrams of one embodiment of a process 900 to rebalance cache vNodes. In FIG. 9A, process 900 begins by receiving a rebalance cache vNode command at block 902. In one embodiment, process 900 receives the rebalance cache vNode command as the result of a StorFS resource addition described above. At block 904, process 900 computes an available space for each pNode. In one embodiment, the available space equals the number of available slots in the CAMS table for each pNode. Process 900 additionally computes the maximum and minimum keyspace distribution for each pNode. At block 906, process 900 determines if the staggers done or if there are no more moves needed. In one embodiment, a stagger is redistribution of cache vNode so that available space is staggered across different pNodes while satisfying fault tolerance constraints. If this stagger is done or there are no more moves required execution proceeds to block 914. If the stagger is not done or there are further moves required, at block 908, process 900 picks the pNode with the minimum available space for the available keyspace. At block 910, process 900 finds a new assignment for the selected minor based on current resources by employing the vNode mapper cache vNode allocation. In one embodiment, vNode mapper cache vNode allocation is further described in FIG. 7 above.

Process 900 inserts a move into a move list for this vNode based on its old and new assignment in the move list at block 912. In one embodiment, the move list is a set of vNode moves that are to be performed. Execution proceeds to block 904 above. At block 914, process 900 processes the move list. In one embodiment, process 900 moves the cache vNode. A block 916, process 900 determines if the staggers are complete. If the stagger is not complete, process 900 continues on to block 918 below. If the stagger is not complete, execution proceeds to block 904 above.

Process 900 continues in FIG. 9B at block 918, in which process 900 computes the number of moves required based on an old view and a new view. In one embodiment, a view is equal to L*C+R, where L is the load on the CAMS, C equals the number of CAMS, and R=number of cache vNodes minus L*C. In addition, an old view is a view before the move are complete and the new view is the view after the moves are completed. In one embodiment, process 900 computes the number of used CAMS and the total number of CAMS. In one embodiment, a used CAMS is a CAMS that is allocated and currently being used by the StorFS system. At block 920, process 900 computes a new CAMS for the cache vNodes. Process 900 computes a load on the pNode at block 922. In one embodiment, the load is the number of primary cache vNodes on this pNode. Process 900 sorts the pNodes based on this load at block 924. At block 926, process 900 determines if the total number of moved cache vNode is less than vNode number of moves. If the total number of moved cache vNode is greater than or equal to the number of moves, execution proceeds to block 936 below. If the total number of move cache vNode is less than the number of moves, at block 928, process 900 picks up a pNode from the sorted list in a round-robin fashion. At block 930, process 900 picks a cache vNode on the primary pNode. Process 900 picks a CAMS in a round-robin fashion a block 932. At block 924, process 900 changes the write log group based on the cache vNode primary and the new CMS for this cache vNode. Execution proceeds to block 926 above. At block 936, process 900 performs a rebalance metadata with cache. In one embodiment a rebalance metadata with cache is further described in FIG. 10 below.

Figure 10:
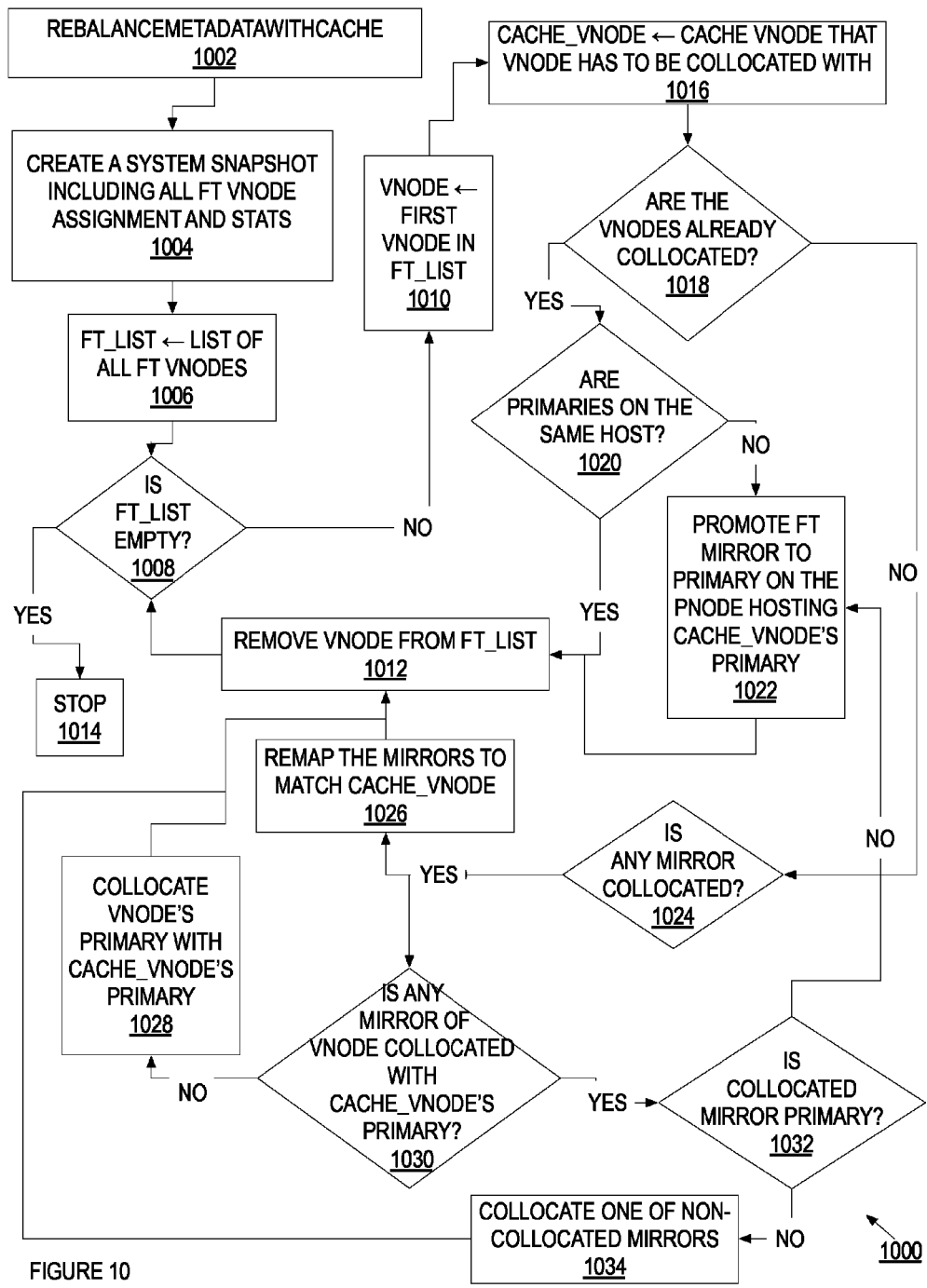
FIG. 10 is a flow diagram of one embodiment of a process to rebalance metadata with a cache.

FIG. 10 is a flow diagram of one embodiment of a process 1000 to rebalance metadata with a cache. In FIG. 10, process 1000 begins by receiving a rebalance metadata with cache request at block 1002. In one embodiment, a rebalance metadata with cache request is received by process 1000 as the result of a rebalance cache vNode process, such as process 900 described above in FIG. 9. At block 1004, process 1000 creates a system snapshot including the filetree vNode assignments and statistics. At block 1006, process 1000 sets the variable FT_list equal to the list of the filetree vNodes. At block 1008, process 1000 determines if FT_list is empty. If FT_list is empty, process 1000 stops at block 1014. If FT_list is not empty, at block 1010, process 1000 sets the current vNode to be the first vNode in FT_list. At block 1016, process 1000 sets the cache_vNode equal to the cache vNode that the vNode has been collocated with. In one embodiment, a collocated vNode is a pair of vNodes that are located on the same pNode. At block 1018, process 1000 determines if the vNodes are already collocated. If the vNodes are not already collocated, execution proceeds to block 1024. If the vNodes are already collocated, at block 1020, process 1000 determines if the primaries are on the same host. If the primaries are not on the same host, process 1000 promotes the file tree mirror to the primary on the pNodes hosting the cache_vNode primary at block 1022. If the primaries are on the same host, process 1000 removes the vNode from the FT_list. Execution proceeds to block 1008 above.

At block 1024, process 1000 determines if there are any minors that are collocated for this cache vNode. If there are no minors that are collocated, process 1000 re-maps the mirror to match the cache vNode at block 1026. Execution proceeds to block 1012 above. If any of the minors are collocated, process 1000 determines if any mirror of this vNode is collocated with the cache_vNode primary at block 1030. If so, at block 1032, process 1000 determines if the collocated mirror is a primary. If the collocated minor is not a primary, execution proceeds to block 1022 above. If the collocated minor is a primary, process 1000 collocates one of the non-collocated mirrors at block 1034. Execution proceeds to block 1012 above. If none of the minors of the vNode are collocated with the cache_v-Node primary, process 1000 collocates a vNode's primary with the cache_vNode primary at block 1028. Execution proceeds to block 1012 above.

Figure 11:
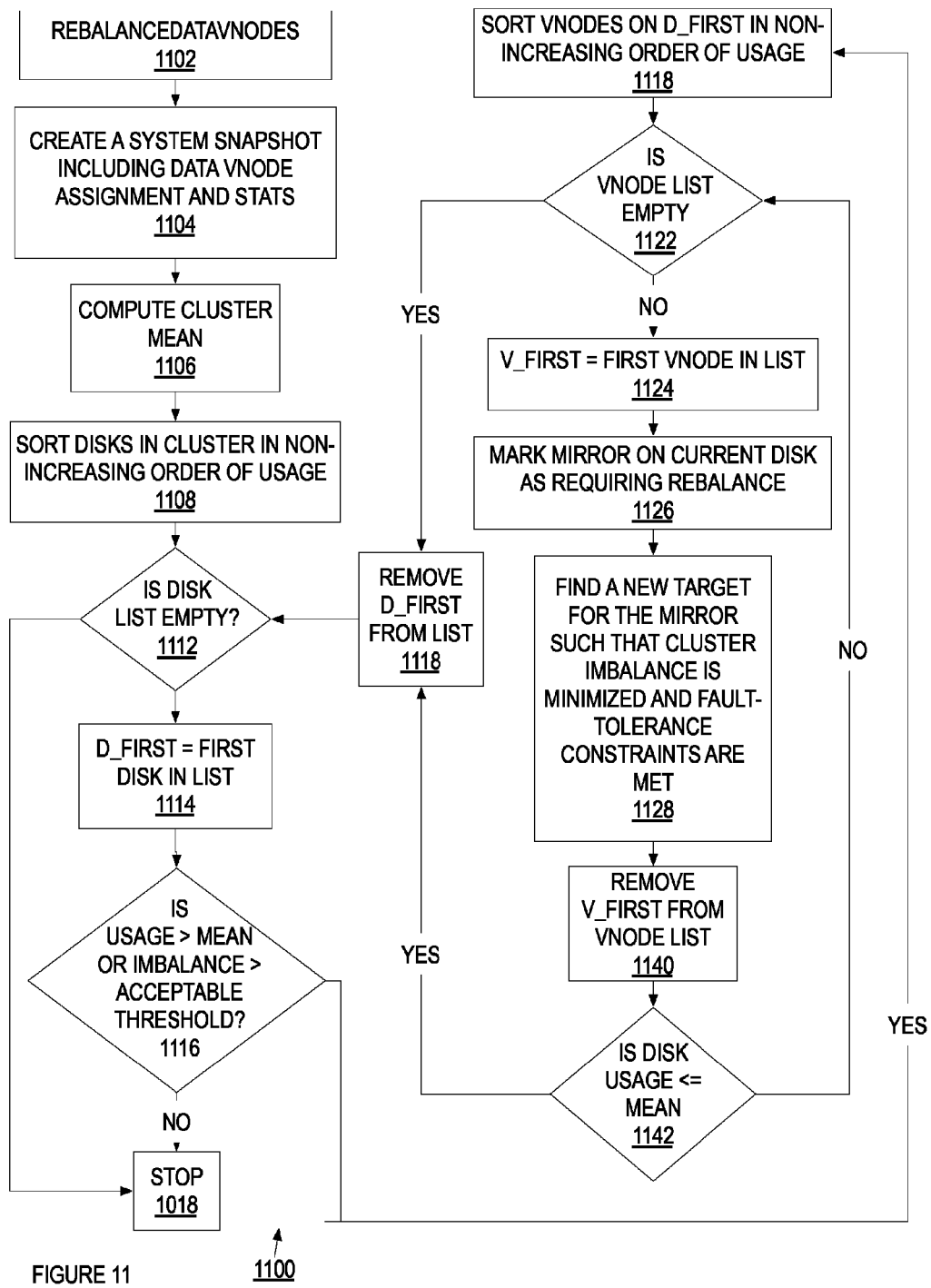
FIG. 11 is a flow diagram of one embodiment of a process to rebalance data vNodes.

FIG. 11 is a flow diagram of one embodiment of a process 1100 to rebalance data vNodes. In FIG. 11, process 1100 begins by receiving a rebalance date of vNodes command request at block 1102. At block 1104, process 1100 creates a system snapshot including all data of vNode assignments and statistics. Process 1100 computes cluster mean at block 1106. In one embodiment, a cluster mean is the ratio of total disk usage to the total number of disks in the cluster. At block 1108, process 1100 sorts the disk in the cluster in non-increasing order of usage. Process 1100 determines if the disk list is empty at block 1112. If the disk list is empty, process 1100 stops at block 1118. If the disk list is not empty, process 1100 sets the variable d_first equal to the first disk in the list at block 1114. At block 1116, process 1100 determines if the usage of d_first is greater than the mean or that the imbalances greater than the acceptable threshold. If the usage is less than or equal to the mean or the imbalance is less than or equal to than the acceptable threshold, process 1100 stops at block 1118. If usage is greater than the mean or the imbalance is greater than the acceptable threshold, process 1100 sorts the vNodes on D_first in increasing order of usage at block 1120. At block 1122, process 1100 determines if the vNode list is empty. If the vNode list is empty, process 1100 removes the first d_first from the list at block 1110. If the vNode list is not empty, process 1100 sets the variable v_first equal to the first vNode in the list of block 1124. At block 1128, process 1100 marks the minor on the current disk as requiring rebalance. Process 1100 finds a new target for the minor such that the cluster imbalances are minimized and fault tolerance constraints are met at block 1128. At block 1130, process 1100 removes v_first from the vNode list. At block 1132, process 1100 determines if the disk usage is less than or equal to the mean. If the disk usage is less than or equal to the mean, execution proceeds to block 1110, where process 1100 removes d_first from the list. If the disk usage is greater than the mean, execution proceeds to block 1122 above.

Figure 12:
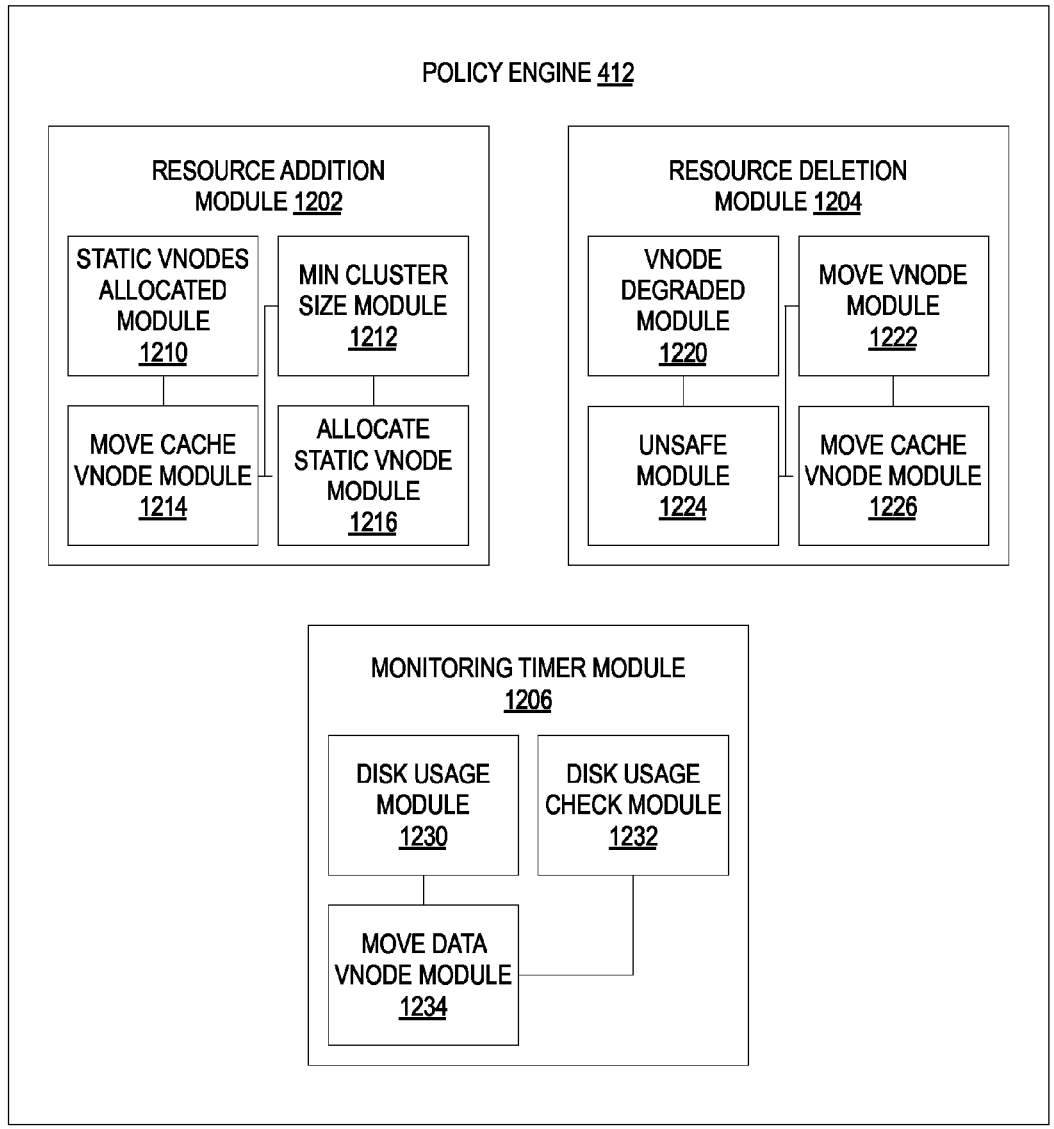
FIG. 12 is a block diagram of one embodiment of a policy engine that manages vNode movement.

FIG. 12 is a block diagram of one embodiment of a policy engine 412 that manages vNode movement. In one embodiment, policy engine 412 includes resource addition module 1202, resource deletion module 1204, and monitoring timer module 1206. In one embodiment, the resource addition module 1202 includes static vNodes allocated module 1210, minimum cluster size module 1212, move cache vNode module 1214, and allocate static vNode module 1216. In one embodiment, the static vNodes allocated module 1210 determines if the static vNodes are allocated as described above in FIG. 5A, block 504. The minimum cluster size module 1212 determines if the minimum cluster sizes are met as described above in FIG. 5A, block 508. The move cache vNode module 1214 moves the cache vNodes as described above in the FIG. 5A, block 506. The allocate static vNode module allocates a static vNode as described above in FIG. 5A, block 510.

In one embodiment the resource mod deletion module 1204 includes vNode degraded module 1220, move vNode module 1222, unsafe module 1224, and move cache vNode module 1226. In one embodiment of vNode degraded module 1220 determines if there are vNodes which have degraded as described above in FIG. 5B, block 544. The move vNode module 1222 determines if the vNodes can be moved to a different pNode as described above in FIG. 5B, block 546. The unsafe module 1224 indicates to the cluster that is unsafe to allow operations as described above in FIG. 5B, block 548. The move cache vNode module 1226 moves to cache vNodes described above in FIG. 5B, block 550.

In one embodiment, the monitoring timer module 1206 includes a disk usage module 1230, disk usage check module 1232, and move data vNode module 1234. In one embodiment, the disk usage module 1230 finds the disk usage in the cluster as described above in FIG. 5C, block 584. The disk usage check module determines if the D_first usage is greater than the mean as described above in FIG. 5C, block 588. The move data vNode module moves the data vNode as described above and FIG. 5C, block 590.

Figure 13:
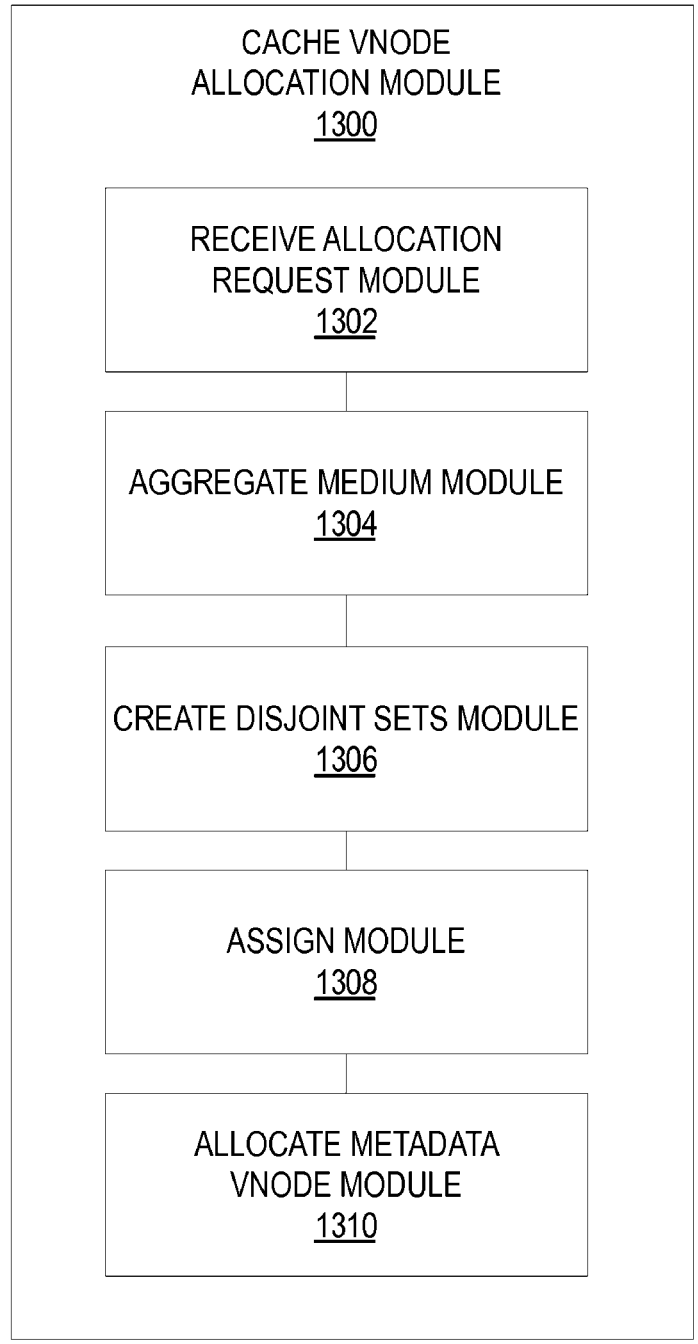
FIG. 13 is a block diagram of one embodiment of a cache vNode allocation module that allocates cache vNodes.

FIG. 13 is a block diagram of one embodiment of a cache vNode allocation module 1300 that allocates cache vNodes. In one embodiment the cache vNode allocation module 1300 includes a receive allocation request module 1302, aggregate media module 1304, create disjoint sets module 1306, assign module 1308, and allocate metadata of vNode module 1310. In one embodiment, the receive allocation request module 1302 receives the cache vNode allocation request as described above in FIG. 6, lots block 602. The aggregate media module 1304 aggregates the cache medium storage reposted as described above in FIG. 6, block 604. The create disjoint sets module 1306 creates disjoint sets of write log groups as described above in FIG. 6, block 606. The assign module 1308 assigns cache vNodes to CAMS as described above in FIG. 6, block 608. The allocate metadata vNode module 1310 performs a metadata vNode allocation as described above in FIG. 6, block 610.

Figure 14:
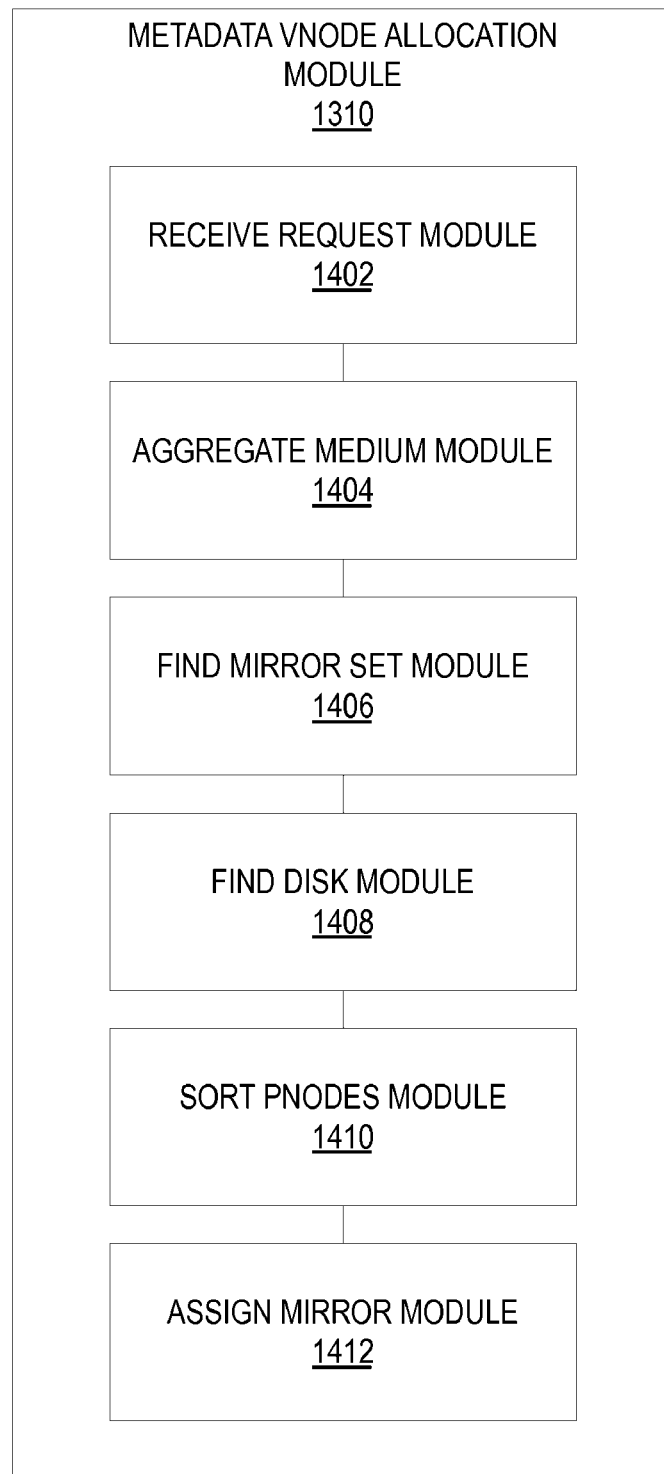
FIG. 14 is a block diagram of one embodiment of a metadata vNode allocation module that allocates metadata vNodes.

FIG. 14 is a block diagram of one embodiment of a metadata vNode allocation module 1310 that allocates metadata vNodes. In one embodiment, the metadata vNode allocation module 1400 includes a receive request module 1402, aggregate media module 1404, find minor set module 1406, find disk module 1408, sort pNodes module 1410, and assign minor set module 1412. In one embodiment, the receive request module receives a metadata vNode allocation request as described above in FIG. 7, block 702. The aggregate media module 1404 aggregates persistent medium storage reposted as described above in FIG. 7, block 704. The find minor set module 1506 finds the mirror set of its corresponding cache vNodes as described above in FIG. 7, block 706. The find disk module 1408 finds a disk that has a maximum number of empty segment stores as described above in FIG. 7, block 708. The sort pNodes module sorts the pNodes in the system based on the pNode weights as described above in FIG. 7, block 714. The assign mirror module 1412 assigns the mirror set as described above in FIG. 7, block 716.

Figure 15:
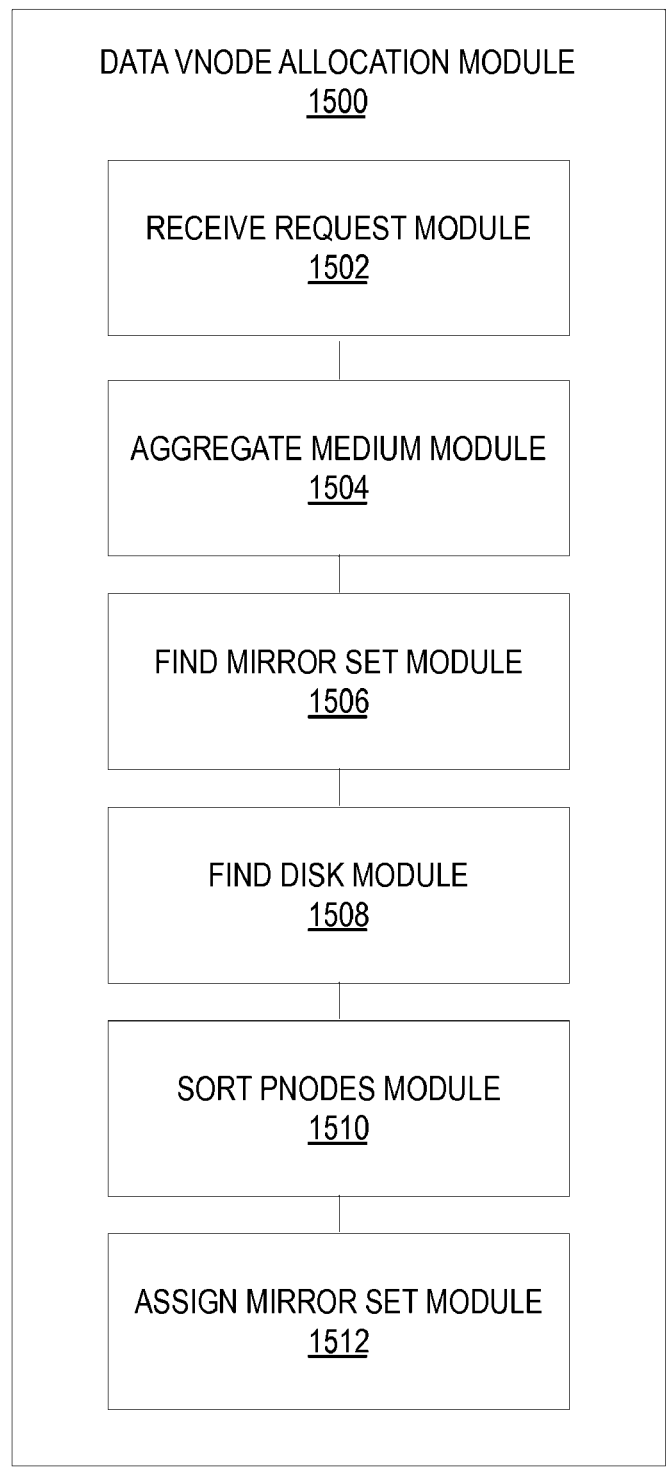
FIG. 15 is a block diagram of one embodiment of a data vNode allocation module that allocates data vNodes.

FIG. 15 is a block diagram of one embodiment of a data vNode allocation module 1500 that allocates data vNodes. In one embodiment, the allocate data vNode module 1500 includes a receive request module 1502, aggregate media module 1504, find mirror set module 1506, find disk module 1508, sort pNodes module 1510, and assign mirror set module 1512. In one embodiment, the receive request module receives a data vNode allocation request as described above in FIG. 8, block 802. The aggregate media module 1504 aggregates persistent medium storage reposted as described above in FIG. 8, block 804. The find minor set module 1506 finds the mirror set of its corresponding metadata vNodes as described above in FIG. 8, block 806. The find disk module 1508 finds a disk that has a maximum capacity as described above in FIG. 8, block 808. The sort pNodes module sorts the pNodes in the system based on their weights as described above in FIG. 8, block 815. The assign minor module 1512 assigns the mirror set as described above in FIG. 8, block 816.

Figure 16:
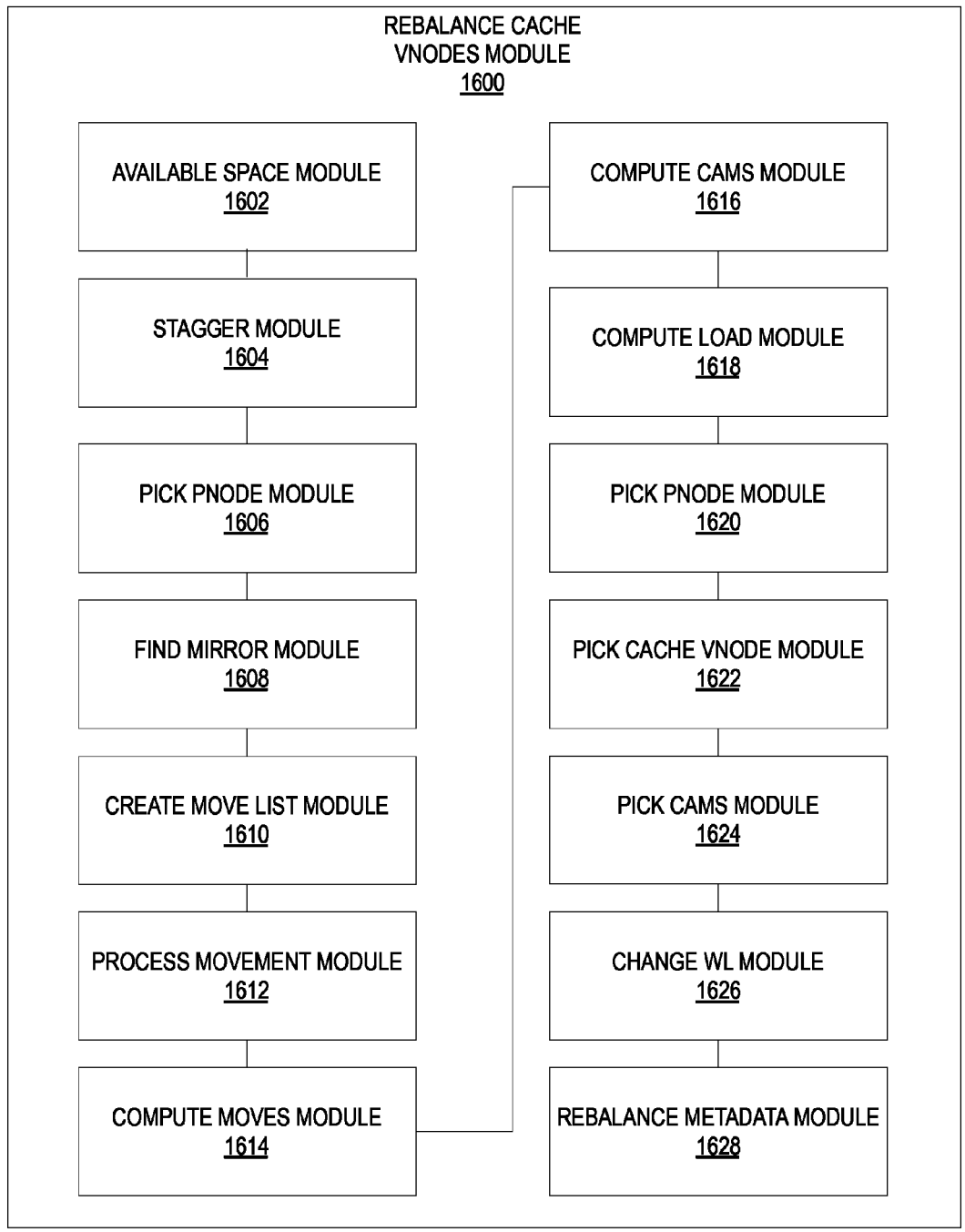
FIG. 16 is a block diagram of one embodiment of a rebalance cache vNode module that rebalances cache vNodes.

FIG. 16 is a block diagram of one embodiment of a rebalance cache vNode module 1600 that rebalances cache vNodes. In one embodiment the rebalance cache module 1600 includes and available space module 1602, stagger module 1604, pick pNode module 1606, find minor module 1608, create move list module 1610, process movement module 1612, compute moves module 1614, compute CAMS module 1616, compute load module 1618, pick sorted pNode module 1620, pick cache vNode module 1622, pick CAMS module 1624, change write log module 1626, and rebalance metadata module 1628. In one embodiment, the available space module 1602 computes the available space for each pNode as described above in FIG. 9A, block 904. The stagger module determines if the stagger is done as described above in FIG. 9A block 906. The pick pNode module 1606 picks the pNode with the minimum available space as described above in FIG. 9A, block 908. The find minor module 1608 finds a new assignment for the selected mirror as described above in FIG. 9A, block 910. The create move list module 1610 inserts a move for this vNode as described above in FIG. 9A, block 912. The process move list module 1612 processes the move list as described above in FIG. 9A, block 914. The compute moves module 1614 computes the number of moves required as described above in FIG. 9B, block 918. The compute CAMS module 1616 computes the new CAMS as described above in FIG. 9B, block 920. The compute load module 1618 computes a load on pNode as described above in FIG. 9B, block 922. The pick sorted pNode module 1620 picks a pNode from a sorted list as described above in FIG. 9B, block 928. The pick cache vNode module 1622 picks the cache vNode for this pNode as described above in FIG. 9B, block 930. The pick CAMS module picks a CAMS as described above in block in FIG. 9B, block 932. The change write log group may module 1626 changes the write log group as described above in FIG. 9B, block 934. The rebalance metadata module 1628 rebalance the metadata vNodes with cache as described above in FIG. 9B, block 936.

Figure 17:
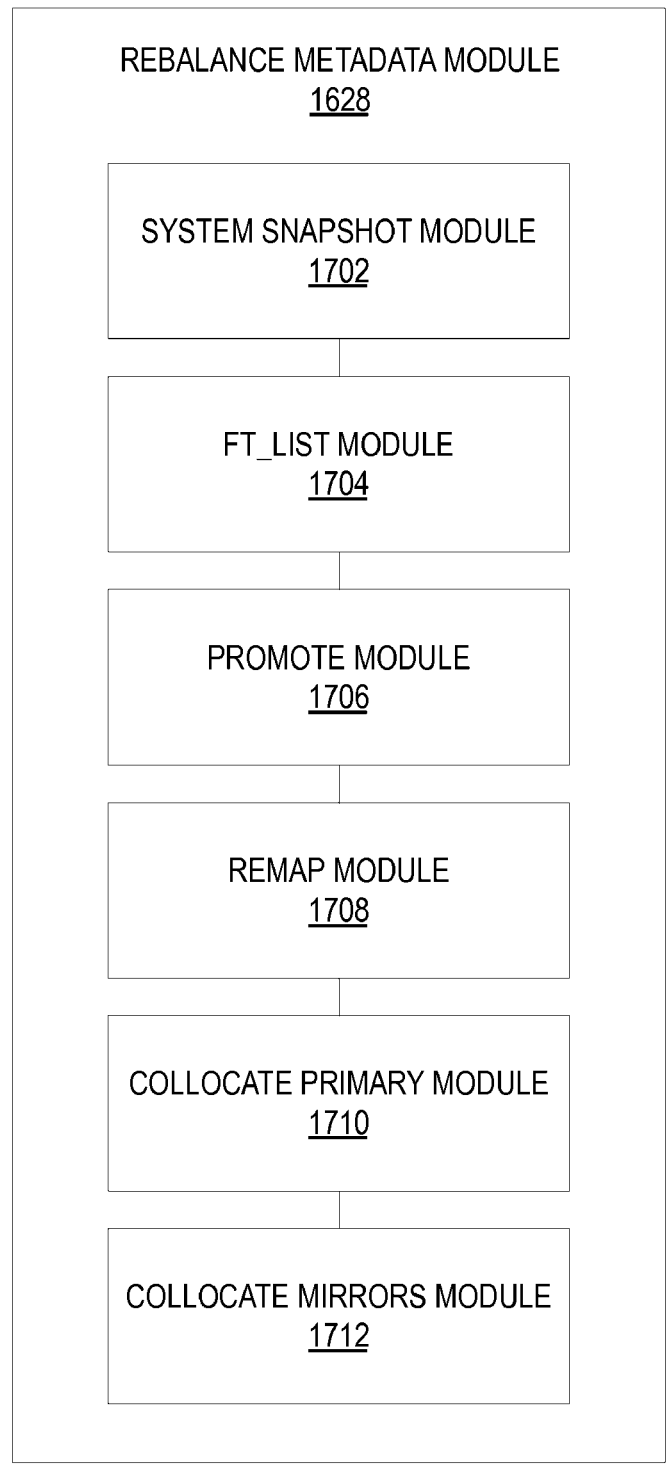
FIG. 17 is a block diagram of one embodiment of a rebalance metadata vNode module that rebalances metadata vNodes with a cache.

FIG. 17 is a block diagram of one embodiment of a rebalance metadata vNode module 1628 that rebalances metadata vNodes with a cache. In one embodiment, the rebalance metadata vNode module 1628 includes a system snapshot module 1702, FT_list module 1704, promote module 1706, remap module 1708, collocate primary module 1710, and collocate minors module 1712. In one embodiment, the system snapshot module 1702 creates a system snapshot as described above in FIG. 10, block 1004. The FT_list module 1704 sets the FT_list as described above in FIG. 10, block 1006. The promote module 1706 promotes a filetree minor as described above in FIG. 10, block 1022. The remap module 1708 remaps the mirrors to match the cache_vNode as described above in FIG. 10, block 1026. The collocate primary module 1710 collocates a vNode primary with a cache_vNode primary as described above in FIG. 10, block 1028. The collocate minors module 1712 collocates one of the non-collocated minors as described above in FIG. 10, block 1034.

Figure 18:
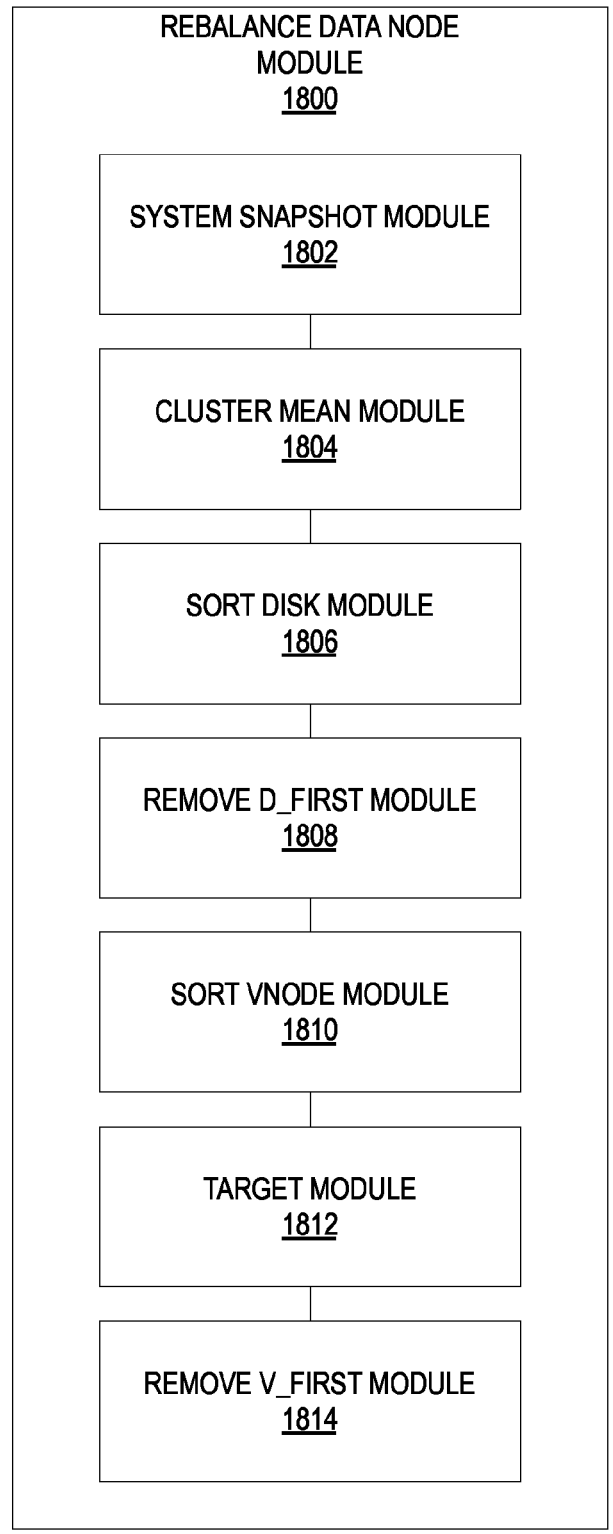
FIG. 18 is a block diagram of one embodiment of a rebalance data vNode module that rebalances data vNodes.

FIG. 18 is a block diagram of one embodiment of a rebalance data vNode module 1800 that rebalances data vNodes. In one embodiment, the rebalance data vNode module 1800 includes a system snapshot module 1802 cluster mean module 1804, sort disk module 1806, remove d_first module 1806, sort vNode module 1810, target module 1812, remove d_first module 1814. In one embodiment the system snapshot module 1802 creates a system snapshot as described above in FIG. 11, block 1104. The compute cluster mean module 1804 computes cluster mean described above in FIG. 11, block 1106. The sort disk module 1806 sorts the disk in the cluster in a non-increasing order of usage as described above in FIG. 11, block 1108. The remove d_first module 1808 removes d_first from a list as described above in FIG. 11, block 1118. The sort vNode module 1810 sorts vNodes on d_first as described above in FIG. 11, block 1120. The target module 1812 find a new target for the minor as described above in FIG. 11, block 1128. The remove d_first module 1814 removes d_first from vNode list as described above in FIG. 11, block 1130.

Figure 19:
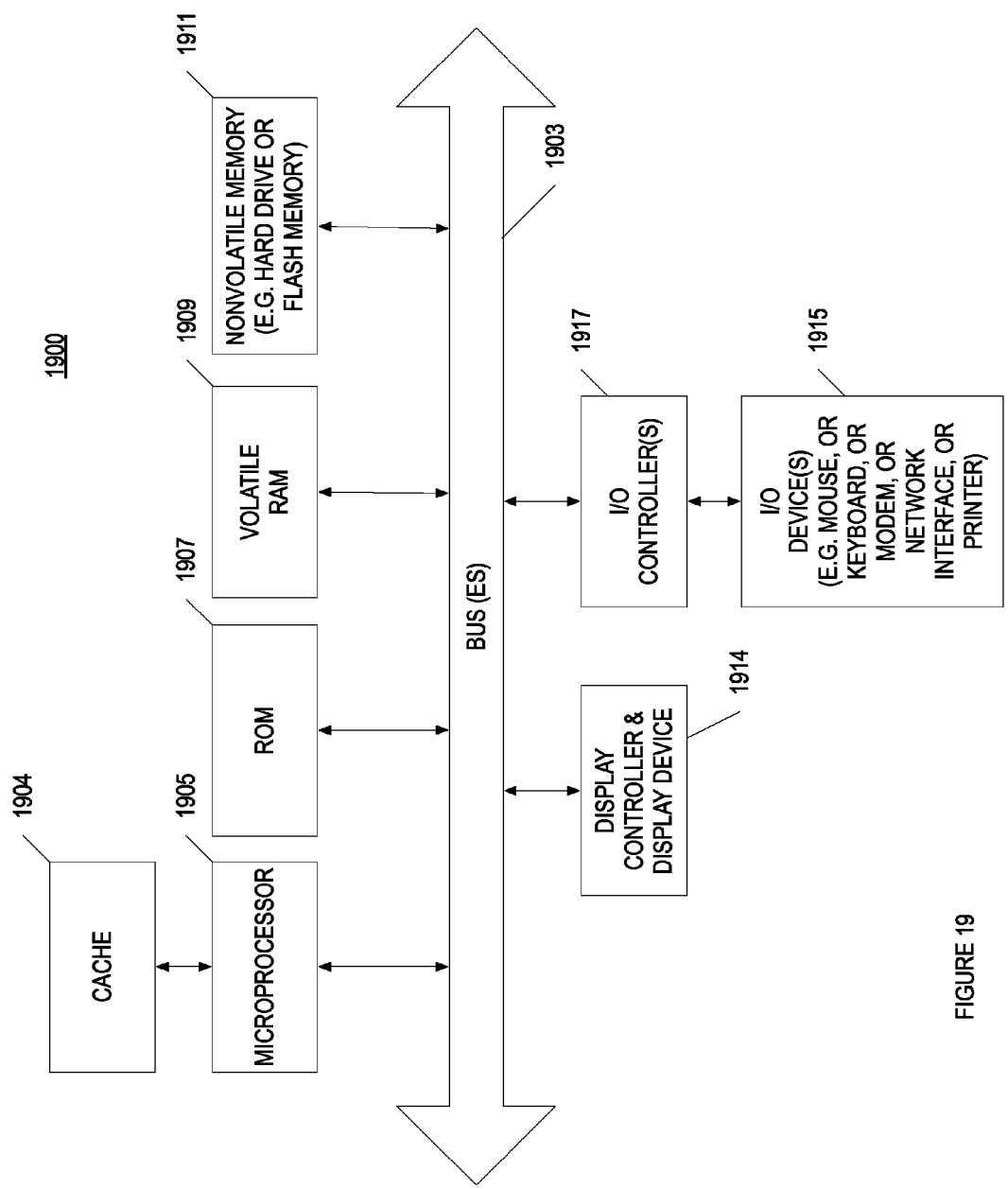
FIG. 19 illustrates one example of a typical computer system, which may be used in conjunction with the embodiments described herein.

FIG. 19 shows one example of a data processing system 1900, which may be used with one embodiment of the present invention. For example, the system 1900 may be implemented including a physical server 192A-C as shown in FIG. 1. Note that while FIG. 19 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 19, the computer system 1900, which is a form of a data processing system, includes a bus 1903 which is coupled to a microprocessor(s) 1905 and a ROM (Read Only Memory) 1907 and volatile RAM 1909 and a volatile memory 1911. The microprocessor 1905 may retrieve the instructions from the memories 1907, 1909, 1911 and execute the instructions to perform operations described above. The bus 1903 interconnects these various components together and also interconnects these components 1905, 1907, 1909, and 1911 to a display controller and display device 1913 and to peripheral devices such as input/output (I/O) devices which may be mice, keyboards, modems, network interfaces, printers and other devices which are well known in the art. Typically, the input/output devices 1915 are coupled to the system through input/output controllers 1917. The volatile RAM (Random Access Memory) 1909 is typically implemented as dynamic RAM (DRAM), which requires power continually in order to refresh or maintain the data in the memory.

The mass storage 1911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1911 will also be a random access memory although this is not required. While FIG. 19 shows that the mass storage 1911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "moving," "computing," "detecting," "performing," "reading," "writing," "transferring," "updating," "collocating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium storing executable instructions to cause one or more processing units to perform a method to load balance a distributed storage system, the method comprising:
    detecting a load balancing event in the distributed storage system servicing user input output (IOs), wherein the distributed storage system includes a plurality of virtual nodes distributed across a plurality of physical nodes;
    in response to detecting the load balancing event, determining that a current virtual node is to move from a source physical node to a destination physical node without a disruption to the user IOs, wherein the current virtual node is one of the plurality of virtual nodes and the source and destination physical nodes are in the plurality of physical nodes; and
    moving the current virtual node from the source physical node to the destination physical node without disrupting the user IOs, wherein the current virtual node is a virtual node for storing objects, and wherein the current virtual node includes a corresponding mirror node that is online in a different location during moving of the current virtual node from the source physical node to the destination physical node without disrupting the user IOs.

2. The non-transitory machine-readable medium of claim 1, wherein a virtual node is a collection of objects.

3. The non-transitory machine-readable medium of claim 1, wherein the current virtual node is selected from the group consisting of a cache virtual node, a metadata virtual node, and a data virtual node.

4. The non-transitory machine-readable medium of claim 3, further comprising:
    collocating a corresponding metadata virtual node with its corresponding cache virtual node on the destination physical node.

5. The non-transitory machine-readable medium of claim 1, wherein each of the plurality of physical nodes is a server that includes a storage medium.

6. The non-transitory machine-readable medium of claim 5, wherein the storage medium is selected from the group consisting of flash drive, solid state drive, and hard disk drive.

7. The non-transitory machine-readable medium of claim 1, wherein the load balancing event is selected from the group consisting of resource addition, resource deletion, statistics monitoring, and user event.

8. The non-transitory machine-readable medium of claim 1, wherein the load balancing event can be triggered by a user implicitly via resource addition or resource deletion and explicitly via drag-and-drop user interfaces.

9. The non-transitory machine-readable medium of claim 1, wherein the current virtual node can be moved independently or in a group with another virtual node.

10. The non-transitory machine-readable medium of claim 1, further comprising:
    placing the current virtual node such that the user IOs and metadata associated with user data is evenly distributed across physical resources in the distributed storage system.

11. A computerized method that performs a method to load balance a distributed storage system, the method comprising:
    detecting a load balancing event in the distributed storage system servicing user input output (IOs), wherein the distributed storage system includes a plurality of virtual nodes distributed across a plurality of physical nodes;
    in response to detecting the load balancing event, determining that a current virtual node is to move from a source physical node to a destination physical node without a disruption to the user IOs, wherein the current virtual node is one of the plurality of virtual nodes and the source and destination physical nodes are in the plurality of physical nodes; and
    moving the current virtual node from the source physical node to the destination physical node without disrupting the user IOs, wherein the current virtual node is a virtual node for storing objects, and wherein the current virtual node includes a corresponding minor node that is online in a different location during moving of the current virtual node from the source physical node to the destination physical node without disrupting the user IOs.

12. The computerized method of claim 11, wherein the current virtual node is selected from the group consisting of a cache virtual node, a metadata virtual node, and a data virtual node.

13. The computerized method of claim 12, further comprising:
    collocating a corresponding metadata virtual node with its corresponding cache virtual node on the destination physical node.

14. The computerized method of claim 11, wherein the load balancing event is selected from the group consisting of resource addition, resource deletion, statistics monitoring, and user event.

15. The computerized method of claim 11, wherein the load balancing event can be triggered by a user implicitly via resource addition or resource deletion and explicitly via drag-and-drop user interfaces.

16. A load balancing distributed storage system comprising:
    an interconnection network;
    a plurality of physical nodes interconnected by the interconnection network;
    a plurality of virtual nodes; and
    a plurality of storage controllers interconnected by the interconnection network, wherein each of the plurality of storage controllers includes,
        a cluster manager that load balances the load balancing distributed storage system, the cluster manager including,
            an agent that detects a load balancing event in the distributed storage system servicing user input output (IOs), wherein the load balancing distributed storage system includes a plurality of virtual nodes distributed across the plurality of physical nodes;

a master, coupled to the agent, that, in response to detecting the load balancing event, determines that a current virtual node is to move from a source physical node to a destination physical node without a disruption to the user IOs, wherein the current virtual node is one of the plurality of virtual nodes and the source and destination physical nodes are in the plurality of physical nodes; and a virtual node manager, coupled to the master, that moves the current virtual node from the source physical node to the destination physical node without disrupting the user IOs, wherein the current virtual node is a virtual node for storing objects, and wherein the current virtual node includes a corresponding minor node that is online in a different location during moving of the current virtual node from the source physical node to the destination physical node without disrupting the user IOs.

17. The load balancing distributed storage system of claim 16, wherein the current virtual node is selected from the group consisting of a cache virtual node, a metadata virtual node, and a data virtual node.

18. The load balancing distributed storage system of claim 17, further comprising:

a virtual node mapper, coupled to the virtual node manager, that collocates a corresponding metadata virtual node with its corresponding cache virtual node on the destination physical node.

19. The load balancing distributed storage system of claim 16, wherein the load balancing event is selected from the group consisting of resource addition, resource deletion, statistics monitoring, and user event.

20. The load balancing distributed storage system of claim 16, wherein the load balancing event can be triggered by a user implicitly via resource addition or resource deletion and explicitly via drag-and-drop user interfaces.

* * * * *